(12) United States Patent
Deleeuw et al.

(10) Patent No.: US 10,140,474 B2
(45) Date of Patent: Nov. 27, 2018

(54) TECHNIQUES FOR CONTEXT INFORMATION MANAGEMENT

(71) Applicant: INTEL CORPORATION, Santa Clara, CA (US)

(72) Inventors: William C. Deleeuw, Beaverton, OR (US); Ned M. Smith, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 129 days.

(21) Appl. No.: 14/369,275

(22) PCT Filed: Dec. 23, 2013

(86) PCT No.: PCT/US2013/077520
§ 371 (c)(1),
(2) Date: Jul. 2, 2015

(87) PCT Pub. No.: WO2015/099662
PCT Pub. Date: Jul. 2, 2015

(65) Prior Publication Data
US 2016/0350555 A1    Dec. 1, 2016

(51) Int. Cl.
*G06F 21/00* (2013.01)
*G06F 21/62* (2013.01)
*G06F 7/58* (2006.01)
*G06F 17/30* (2006.01)

(52) U.S. Cl.
CPC ............ *G06F 21/6254* (2013.01); *G06F 7/58* (2013.01); *G06F 17/30336* (2013.01); *G06F 17/30528* (2013.01); *G06F 17/30867* (2013.01); *G06F 21/6245* (2013.01)

(58) Field of Classification Search
CPC .. G06F 21/6254; G06F 17/30867; G06F 7/58; G06F 17/30336; G06F 17/30528; G06F 21/6245
See application file for complete search history.

(56) References Cited

U.S. PATENT DOCUMENTS

| | | | |
|---|---|---|---|
| 2008/0109362 A1* | 5/2008 | Fransdonk | G06Q 30/06 705/51 |
| 2011/0213846 A1* | 9/2011 | Sarin | H04L 12/1822 709/206 |
| 2013/0006866 A1* | 1/2013 | Pendakur | G06Q 30/0241 705/50 |
| 2013/0230166 A1* | 9/2013 | Bauchot | H04L 9/0816 380/44 |
| 2013/0230168 A1* | 9/2013 | Takenouchi | G06F 21/6209 380/46 |
| 2015/0160924 A1* | 6/2015 | Kiefer | G06F 21/602 708/250 |

* cited by examiner

*Primary Examiner* — Kendall Dolly

(57) ABSTRACT

Improved techniques for context information management are described. In one embodiment, for example, an apparatus may comprise a processor element, a selection component for execution by the processor element to select a context information item, a random number generator to generate a random number, and an anonymization component for execution by the processor element to generate a random key based on the random number and send a message associating the context information item with the random key. Other embodiments are described and claimed.

11 Claims, 15 Drawing Sheets

TECHNIQUES FOR CONTEXT INFORMATION MANAGEMENT

TECHNICAL FIELD

Embodiments described herein generally relate to implementation and management of computer-implemented databases.

BACKGROUND

In order to support the generation of large-scale statistics and/or metrics describing characteristics and/or preferences of a user community that it serves, an entity such as a cloud service provider may maintain a context information database. The context information database may be populated with various types of information collected from various client devices and their users. In order to respect user privacy considerations, the data in the context information database should be structured in such a way that "at large" database consumers cannot identify the users to which the various data values correspond, and cannot determine which data values may correspond or be related to each other. However, it may also be desirable that the database be structured in such a way that database consumers may receive user authorization to view particular personal information in the database.

DETAILED DESCRIPTION

Various embodiments may be generally directed to improved techniques for context information management. In one embodiment, for example, an apparatus may comprise a processor element, a selection component for execution by the processor element to select a context information item, a random number generator to generate a random number, and an anonymization component for execution by the processor element to generate a random key based on the random number and send a message associating the context information item with the random key. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
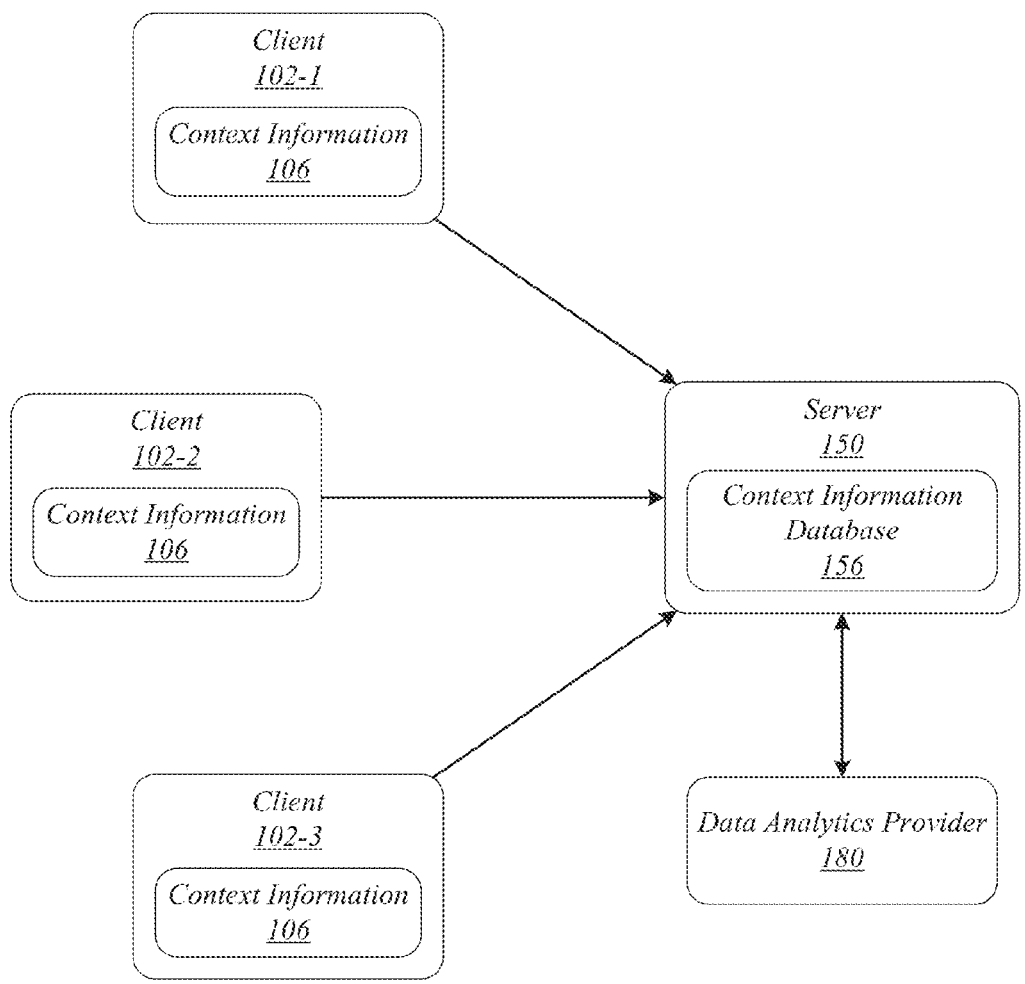
FIG. 1 illustrates one embodiment of a first operating environment.

FIG. 1 illustrates an embodiment of an operating environment 100 such as may be representative of various embodiments. As shown in FIG. 1, various clients 102 communicate with a server 150 in order to provide context information 106 for incorporation into a context information database 156. Each item of context information 106 may comprise descriptive information pertaining to its respective client 102 and/or a user thereof. In one example, an item of context information 106 may indicate a current location of its respective client 102. In another example, an item of context information 106 may identify an age or age group of a user of its respective client 102. In a third example, an item of context information 106 may describe an online purchase made by a user of its respective client 102. The embodiments are not limited to these examples.

In some embodiments, a data analytics provider 180 may communicate with server 150 in order to obtain context information for analysis. By analyzing context information database 156, the data analytics provider 180 may be able to generate statistics, metrics, and/or other information describing preferences, characteristics, behaviors, trends, and/or other parameters associated with large-scale groups of users of clients 102. Data analytics provider 180 may in turn provide this information to advertisers, application developers, content and/or service providers, and/or other entities that may utilize it to better tailor their offerings to large-scale groups that they may wish to serve. Additionally or alternatively, some such entities may access and/or analyze context information database 156 directly, rather than relying on analytics provided by data analytics provider 180. The embodiments are not limited in this context.

Because context information 106 may comprise information of a personal nature, it may need to be handled carefully in order to protect the privacy of users of the clients 102 from which it originates. More particularly, server 150 may make context information 106 available via context information database 156 in conjunction with a privacy scheme according to which the context information 106 is de-identified and/or de-correlated.

When context information 106 is de-identified, an entity such as data analytics provider 180 that accesses context information database 156 may be unable to determine, for any particular item of context information, the identity of the client from which it originated or the identity of a user with which it is associated. For example, if client 102-1 submits context information 106 indicating an age of a user of client 102-1, data analytics provider 180 may be able to access that age value, but may not be able to determine that it is associated with client 102-1 or the user thereof.

When context information 106 is de-correlated, an entity that accesses context information database 156 may be unable to determine, for any particular item of context information, any other items of context information that may correspond to a same client or user. Continuing with the previous example, if client 102-1 previously submitted context information 106 indicating a gender of the user of client 102-1, data analytics provider 180 may be able to access the gender value and the age value, but may not be able to determine that they are associated with a same client or user and thus with each other. The embodiments are not limited to these examples.

Figure 2:
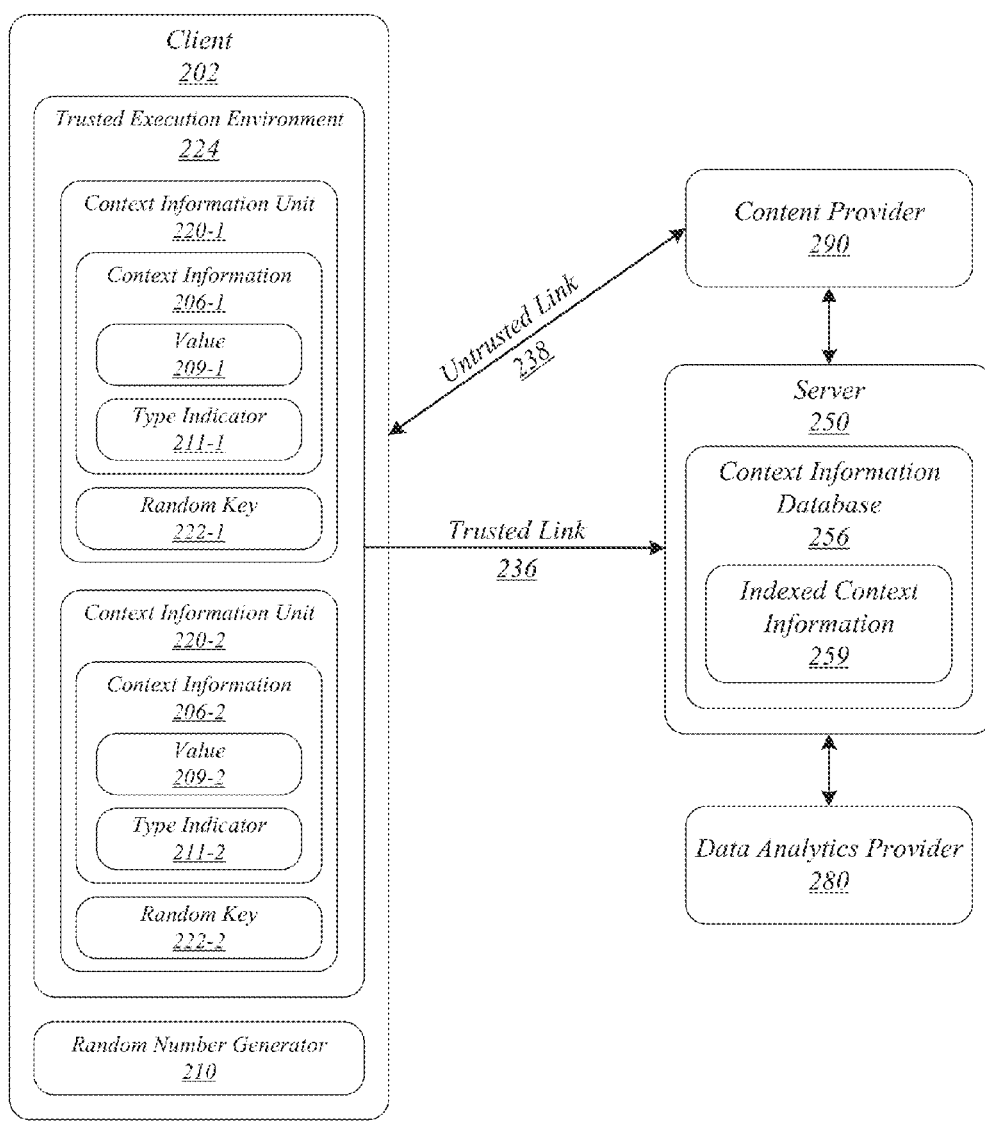
FIG. 2 illustrates one embodiment of a second operating environment.

One approach to ensuring that the context information comprised in context information database 156 is de-identified and de-correlated may involve the generation of distinct random identifiers for each item of context information 106. FIG. 2 illustrates an embodiment of an operating environment 200 in which such an approach may be implemented. As shown in FIG. 2, a client 202 communicates with server 250, which maintains context information database 256. Although operating environment 200 depicts only the single client 202 in the interest of simplicity, it is to be understood that additional clients may also communicate with server 250, and the embodiments are not limited in this context. In various embodiments, each item of context information 206 that client 202 submits may comprise a value 209 and a type indicator 211. Each type indicator 211 may comprise information identifying a characteristic or property described by its corresponding value 209. For example, context information 206-1 may comprise a value 209-1 equal to 36, and may comprise a type indicator 211-1 indicating that the value 209-1 comprises an age of a user of client 202. The embodiments are not limited to this example.

It is worthy of note that in some embodiments, the type indicators 211 for items of context information 206 may be implicit, rather than comprising explicit parameters with the context information 206. For example, in various embodiments, client 202 may be operative to provide context information 206 in accordance with a defined scheme. The defined scheme may identify types of context information 206 that are to be reported and may specify associated reporting intervals. For any particular item of context information 206, the type indicator 211 may be implicitly specified by the defined scheme, and thus may not be explicitly included within the context information 206. The embodiments are not limited to this example.

In the example of FIG. 2, client 202 may be operative to implement a trusted execution environment (TEE) 224 in order to support secure transmission of sensitive data to server 250 via a trusted link 236. For each item of context information 206 that it provides to server 250, client 202 may be operative, from within trusted execution environment 224, to generate and provide a corresponding random key 222. In some embodiments, client 202 may comprise a random number generator (RNG) 210 that is contained within and/or accessible to trusted execution environment 224, and may generate random keys 222 using the RNG 210. For example, as depicted in FIG. 2, client 202 may be operative to use RNG 210 to generate a random key 222-1 for context information 206-1 and may be operative to use RNG 210 to generate a different random key 222-2 for context information 206-2. Client 202 may then be operative to communicate the context information and random keys to server 250 via trusted link 236, in the form of respective context information units 220-1 and 220-2.

When it receives a context information unit 220, server 250 may be operative to add corresponding indexed context information 259 to context information database 256. More particularly, server 250 may be operative to determine a random index value based on the random key 222 in the context information unit 220, and to insert the context information 206 of the context information unit 220 into context information database 256 as indexed context information 259, based on the determined random index value. In some embodiments, prior to processing any particular context information unit in this fashion, server 250 may be operative to employ an attestation protocol to verify that the context information unit originates from a legitimate trusted execution environment such as TEE 224. The embodiments are not limited in this context.

In the example of FIG. 2, a data analytics provider 280 may access context information database 256 and analyze indexed context information 259, in order to generate, for example, user preference information describing collective characteristics, behaviors, trends, and/or other parameters associated with a community of users tracked by context information database 256. A content provider 290 may also access context information database 256, directly and/or via intermediate reporting on the part of data analytics provider 280, in order to obtain such information. The content provider 290 may use this information to better match its content offerings with the types of content that are generally preferred by the user community.

Because the entries in indexed context information 259 are identified by random indices, data analytics provider 280 and/or content provider 290 may not be able to determine the user or client with which any particular entry is associated, nor may they be able to determine whether any two particular entries are associated with different users or clients or with a same user or client. As such, indexed context information 259 may comprise context information that is both de-identified and de-correlated.

In various embodiments, in addition to providing context information 206 to server 250, client 202 may directly communicate with content provider 290. For example, client 202 may be a subscriber of a content service provided by content provider 290, and may communicate with content provider 290 in order to obtain content therefrom. In order to enable content provider 290 to offer content that matches preferences of a user of client 202, it may be desirable for client 202 to enable content provider 290 to become aware of specific context information 206 that corresponds to client 202.

It is worthy of note that in some embodiments, one or both of data analytics provider 280 and content provider 290 may comprise a same entity as that which assembles, maintains, and makes available context information database 256. In an example embodiment, a cloud service that assembles context information database 256 may also act as data analytics provider 280 by generating large-scale statistics and/or metrics based on indexed context information 259. In order to maintain data privacy, the cloud service may implement a privacy screen between software that accepts and incorporates context information 206 into context information database 256 and software that generates the large-scale statistics and/or metrics. In another example, content provider 290 may comprise an online retailer, and may populate context information database 256 with context information 206 describing purchases and/or preferences of its customers. In this example, the content provider 290 may perform queries of context information database 256 in order to customize offerings to its customers, and may also act as data analytics provider 280 by generating large-scale statistics and/or metrics for sale to third-party retailers. The embodiments are not limited to these examples.

It is further worthy of note that although context information database 256 is depicted as being assembled, maintained, and made available by a single server 250, this depiction is presented merely for purposes of simplicity and clarity. It is to be understood that in various embodiments, a plurality of servers 250 may collectively manage context information database 256, and that a client submitting context information 206 may do so via any of the plurality of servers 250. The embodiments are not limited in this context.

In an operating environment such as that of FIG. 2, it may be desirable to implement context information database 256 in such a fashion that it may be updated and queried efficiently, while still preserving data privacy. Additionally, it may be desirable to implement context information database 256 in such a fashion that clients 202 can grant particular entities access to some or all of their particular context information 206 within context information database 256, and thus avoid sending context information to those entities via untrusted links such as untrusted link 238. It may further be desirable that each client 202 can uniquely specify the scope of access that it grants to any particular entity.

However, the use of conventional techniques to implement context information database 256 may result in suboptimal update and/or query efficiency due to frequent database collisions, complex database architectures, and/or other factors. Furthermore, according to conventional techniques, server 250 may need to retain and apply numerous individualized access rules corresponding to access rights that various clients may have granted to various entities to access their personalized context information. Retaining and applying these individualized access rules may further increase complexity and reduce database update and/or query efficiency.

Various embodiments herein are directed to improved techniques for context information management. According to such improved techniques, server 250 may employ a sparse table to contain and organize received context information 206. The sparse table may be comprised of a very large number of buckets, each of which is defined by a respective one of a very large number of possible index values and/or random keys. In various embodiments, for example, each random key 222 may comprise a random 256-bit binary number, server 250 may use each random key 222 as the index value for its respective context information 206, and thus the sparse table may comprise $2^{256}$ buckets. The use of such large index values may yield an extremely low probability of collision between context information items. As a result, additional processing steps for handling of collisions may rarely be required, and database updating efficiency may be improved. Server 250 may employ a binary search algorithm for retrieving context information items using their indices. The highly parallelizable nature of binary searching may be exploited by multi-core processing architectures and/or distributed database architectures in order to realize further efficiency gains in querying and/or updating efficiency. Other advantages may be associated with various embodiments, and the embodiments are not limited in this context.

Figure 3:
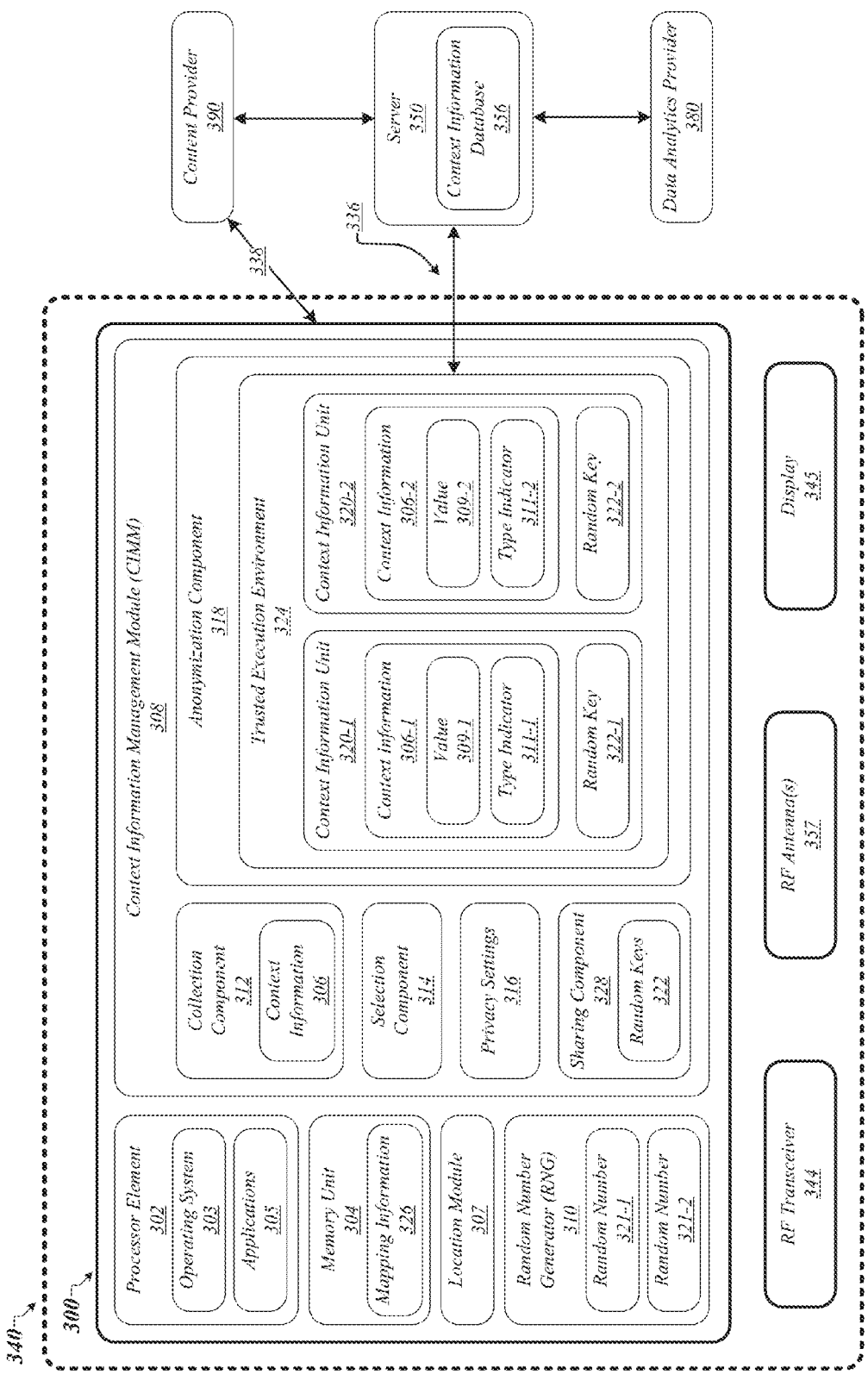
FIG. 3 illustrates one embodiment of a first apparatus and one embodiment of a first system.

FIG. 3 illustrates a block diagram of an apparatus 300. More particularly, apparatus 300 may comprise an example of a client device that implements improved techniques for context information management. As shown in FIG. 3, apparatus 300 comprises multiple elements including a processor element 302, a memory unit 304, a context information management module 308, and a random number generator 310. The embodiments, however, are not limited to the type, number, or arrangement of elements shown in this figure.

In some embodiments, apparatus 300 may comprise processor element 302. Processor element 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, or any other microprocessor or central processing unit (CPU). Processor element 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, processor element 302 may comprise a multi-core processor or other processing circuitry including multiple processing cores. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor element 302, or alternatively some portion or all of memory unit 304 may be disposed on an integrated circuit or other medium, for example a hard disk drive, that is external to the integrated circuit of processor element 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a context information management module (CIMM) 308. CIMM 308 may comprise logic, circuitry, and/or instructions operative to manage the sharing of context information 306 with one or more external devices, networks, or other entities. In some embodiments, CIMM 308 may be operative to manage the provision of context information 306 for inclusion into a context information database 356 by a server 350. In various embodiments, CIMM 308 may be operative to manage access by entities such as content provider 290 of FIG. 2 to context information 306 that it has provided for inclusion into context information database 356. The embodiments are not limited in this context.

In some embodiments, apparatus 300 may comprise a random number generator (RNG) 310. RNG 310 may comprise logic, circuitry, and/or instructions operative to generate random numbers for use by CIMM 308. In various embodiments, RNG 310 may comprise a digital random number generator (DRNG). In some embodiments, RNG 310 may be capable of generating very large random numbers, such as random 128-bit and/or 256-bit numbers. The embodiments are not limited to these examples.

FIG. 3 also illustrates a block diagram of a system 340. System 340 may comprise any of the aforementioned elements of apparatus 300. System 340 may further comprise one or more additional components. For example, in various embodiments, system 340 may comprise a radio frequency (RF) transceiver 344. RF transceiver 344 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 344 may operate in accordance with one or more applicable standards in any version. The embodiments are not limited in this context.

In some embodiments, system 340 may comprise one or more RF antennas 357. Examples of any particular RF antenna 357 may include an internal antenna, an omnidirectional antenna, a monopole antenna, a dipole antenna, an end-fed antenna, a circularly polarized antenna, a microstrip antenna, a diversity antenna, a dual antenna, a tri-band antenna, a quad-band antenna, and so forth. The embodiments are not limited to these examples.

In various embodiments, system 340 may comprise a display 345. Display 345 may comprise any display device capable of displaying information received from processor element 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments are not limited in this context.

In general operation, apparatus 300 and/or system 340 may be operative to provide context information 306 to a server 350 for incorporation into a context information database 356. In various embodiments, the context information 306 may describe characteristics of apparatus 300 and/or system 340, and/or may comprise information descriptive of one or more users thereof. For example, particular context information 306 that apparatus 300 and/or system 340 might submit to server 350 for incorporation into context information database 356 may include an age and gender of a user, information regarding various preferences of the user, and/or a location and device type of apparatus 300 and/or system 340. In some embodiments, each item of context information 306 may comprise a value 309 and a type indicator 311 indicating a characteristic or property that the value 309 describes. For example, context information 306-1 may comprise a value 309-1 equal to "comedies," and may comprise a type indicator 311 indicating that the value 309-1 describes a genre of movies that a user of apparatus 300 and/or system 340 frequently watches. The embodiments are not limited to these examples.

In various embodiments, CIMM 308 may comprise a collection component 312. Collection component 312 may comprise logic, circuitry, and/or instructions operative to generate, assemble, and/or accumulate context information 306 for apparatus 300 and/or system 340. In some embodiments, collection component 312 may generate context information 306 based on information received from various sources within apparatus 300 and/or system 340. In various embodiments, processor element 302 may be operative to execute an operating system 303, and collection component 312 may be operative to generate context information 306 based on parameters associated with and/or provided by the operating system 303. For example, in some embodiments, collection component 312 may be operative to generate context information 306 identifying the operating system 303 and identifying one or more hardware components of apparatus 300. In various embodiments, collection component 312 may additionally or alternatively be operative to generate context information 306 based on information received from sources external to apparatus 300 and/or system 340. In an example embodiment, collection component 312 may generate context information 306 based on information received from a shoe-mounted pedometer. In another example embodiment, collection component 312 may generate context information 306 based on information received from a weather station. The embodiments are not limited to these examples.

In various embodiments, processor element 302 may be operative to execute one or more applications 305, and collection component 312 may be operative to generate context information 306 based on preferences, parameters, and/or other information associated with and/or provided by one or more of the applications 305. For example, in some embodiments, processor element 302 may be operative to execute a streaming video playback application. The streaming video playback application may assemble and maintain a set of user preferences describing types of videos that a user prefers to watch, and collection component 312 may be operative to generate context information 306 based on the set of user preferences. The embodiments are not limited to this example.

In various embodiments, apparatus 300 and/or system 340 may comprise a location module 307. Location module 307 may comprise logic, circuitry, and/or instructions operative to track a physical location of apparatus 300 and/or system 340. In some embodiments, for example, location module 307 may comprise a global positioning system (GPS) module that provides geographic location coordinates for apparatus 300 and/or system 340. In various embodiments, collection component 312 may be operative to generate context information 306 based on information received from location module 307. For example, in embodiments in which location module 307 comprises a GPS module, collection component 312 may be operative to generate context information 306 comprising geographic location coordinates obtained from location module 307. The embodiments are not limited to this example.

In some embodiments, CIMM 308 may comprise a selection component 314. Selection component 314 may comprise logic, circuitry, and/or instructions operative to select items of context information 306 for incorporation into context information database 356. In various embodiments, selection component 314 may be operative to select such items based on privacy settings 316. Privacy settings 316 may comprise information defining parameters and/or rules for the submission of context information 306 for anonymous inclusion in context information database 356. In some embodiments, privacy settings 316 may comprise rules specifying what types of context information 306 are to be provided for anonymous inclusion in context information database 356, rules specifying whether those types of context information 306 are to be provided and/or updated at regular intervals, upon their generation, or on demand, and/or other parameters. The embodiments are not limited in this context.

In various embodiments, CIMM 308 may comprise an anonymization component 318. Anonymization component 318 may comprise logic, circuitry, and/or instructions operative to prepare selected context information 306 for submission to context information database 356 in conjunction with a privacy scheme according to which the context information 306 is de-identified and/or de-correlated. In some embodiments, once selection component 314 has selected one or more items of context information 306 to be provided for anonymous inclusion in context information database 356, anonymization component 318 may be operative to generate one or more context information units 320 that contain those items of context information 306. For example, in the embodiment depicted in FIG. 3, selection component 314 selects context information items 306-1 and 306-2, and anonymization component 318 generates a context information unit 320-1 comprising the context information item 306-1 and generates a context information unit 320-2 comprising the context information item 306-2. The embodiments are not limited to this example.

In various embodiments, anonymization component 318 may be operative to generate context information units 320 using random keys 322. In some embodiments, for each item of context information 306 that selection component 314 has selected for submission to context information database 356, anonymization component 318 may be operative to generate a context information unit 320 comprising the context information 306 and a random key 322. In various embodiments, each random key 322 may comprise and/or correspond to a very large random number, such as a random 128-bit or 256-bit number.

In some embodiments, RNG 310 may be operative to generate random numbers 321, and anonymization component 318 may be operative to obtain the random numbers 321 from RNG 310 and use them as random keys 322. For example, in the embodiment depicted in FIG. 3, RNG 310 generates random numbers 321-1 and 321-2, and anonymization component 318 obtains random numbers 321-1 and 321-2 from RNG 310 and includes them in respective context information units 320-1 and 320-2 as random keys 322-1 and 322-2. In various other embodiments, anonymization component 318 may be operative to perform intermediate processing on random numbers 321 generated by RNG 310, and may use the results as random keys 322. In some such embodiments, anonymization component 318 may be operative to apply a cryptographic hash function to random numbers 321 in order to generate random keys 322. For example, in various embodiments, anonymization component 318 may be operative to generate random keys 322 by applying a secure hash algorithm (SHA)-256 hash function to random numbers 321. The embodiments are not limited in this context.

In some embodiments, once anonymization component 318 has generated one or more context information units 320, CIMM 308 may be operative to send them to server 350 in order that the context information 306 that they contain be anonymously incorporated into context information database 356. In various embodiments, anonymization component 318 may be operative to implement a trusted execution environment (TEE) 324. In some embodiments, TEE 324 may be implemented using an enhanced privacy identifier (EPID) that enables the establishment of a secure yet anonymous trusted link 336. In various embodiments, the EPID may comprise a signing key that may be used in a signed key exchange such as a Diffie-Hellman key exchange to establish trusted link 336. In some embodiments, the use of the EPID may enable server 350 to attest TEE 324 in order to verify that it is an authentic TEE with known operational properties. In some embodiments, CIMM 308 may be operative to send the one or more context information units 320 to server 350 via the trusted link 336. The embodiments are not limited in this context.

In various embodiments, anonymization component 318 may be operative to generate, maintain, and/or update mapping information 326. Mapping information 326 may comprise information identifying various items of context information 306 that have been submitted for incorporation into context information database 356, and identifying respective random keys 322 that correspond to those items of context information 306. In some embodiments, each time it submits a context information unit 320 comprising an item of context information 306 and a corresponding random key 322, anonymization component 318 may be operative to supplement and/or modify mapping information 326 to indicate that the item of context information 306 has been added to context information database 356, and that the random key 322 was used to index the item of context information 306 within context information database 356. In various embodiments, anonymization component 318 may be operative to store mapping information 326 in memory unit 304. The embodiments are not limited in this context.

In some embodiments, some items of context information 306 that selection component 314 selects for incorporation into context information database 356 may comprise updates of previously submitted values. For example, an item of context information 306 that indicates a location of apparatus 300 and/or system 340 may comprise an update of a previously submitted location of apparatus 300 and/or system 340. In various embodiments, anonymization component 318 may be operative to use mapping information 326 to determine whether any particular item of context information 306 comprises an update of a previously submitted value. In some embodiments, when a particular item of context information 306 comprises an update of a previously submitted value, anonymization component 318 may be operative to retrieve and reuse the random key 322 associated with the previously submitted value rather than generating a new random key 322. In various such embodiments, anonymization component 318 may be operative to set a bit, flag, or other parameter in the context information unit 320 to indicate that it comprises an update of a previously submitted item of context information 306, and that the included random key 322 was used for the previously submitted item of context information 306. The embodiments are not limited in this context.

In some embodiments, CIMM 308 may comprise a sharing component 328. Sharing component 328 may comprise logic, circuitry, and/or instructions operative to share one or more items of context information 306 with an entity such as a content provider 390. In various embodiments, sharing component 328 may be operative to select one or more items of context information 306 to be shared based on privacy settings 316. In some embodiments, for example, privacy settings 316 may comprise information defining parameters and/or rules for the non-anonymous provision of context information 306 to various entities such as content provider 390. In various embodiments, privacy settings 316 may comprise different sets parameters and/or rules that are customized to different such entities. The embodiments are not limited in this context.

In some embodiments, sharing component 328 may be operative to make shared items of context information 306 available to content provider 390 in such a way that the shared context information 306 is not de-identified and/or is not de-correlated. In an example, sharing component 328 may be operative to share with content provider 390 context information 306 that indicates an age and gender of a user of apparatus 300 and/or system 340, and may do so in such a way that content provider 390 is aware that the age and gender values describe a same person, and that that person is a user of apparatus 300 and/or system 340. The embodiments are not limited to this example.

In various embodiments, apparatus 300 and/or system 340 may communicate with content provider 390 over an untrusted link 338. In some embodiments, sharing component 328 may be operative to share items of context information 306 with content provider 390 by providing, via untrusted link 338, one or more random keys 322 useable by content provider 390 to locate the items of context information 306 within context information database 356. In various embodiments, sharing component 328 may determine the one or more random keys 322 based on mapping information 326. In some embodiments, by simply sending random keys 322 to content provider 390 rather than sending the actual context information 306 to be shared, sharing component 328 may avoid sending sensitive data over untrusted link 338. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
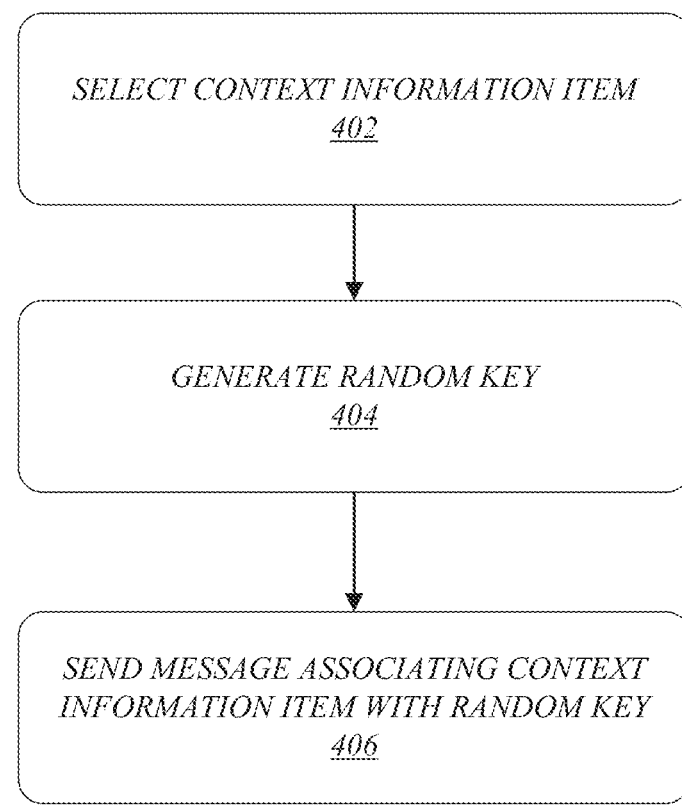
FIG. 4 illustrates one embodiment of a first logic flow.

FIG. 4 illustrates one embodiment of a logic flow 400, which may be representative of the operations executed by one or more embodiments described herein. More particularly, logic flow 400 illustrates an example of a process that may be performed by apparatus 300 and/or system 340 of FIG. 3 in various embodiments. As shown in logic flow 400, a context information item may be selected at 402. For example, selection component 314 of FIG. 3 may be operative to select an item of context information 306 from among those collected by collection component 312. At 404, a random key may be generated. For example, anonymization component 318 of FIG. 3 may be operative to generate a random key 322 based on a random number 321 supplied by RNG 310. At 406, a message may be sent that associates the context information item with the random key. For example, anonymization component 318 of FIG. 3 may be operative to generate a context information unit 320 comprising the context information 306 and the random key 322, and apparatus 300 may be operative to send a message comprising the context information unit 320 to server 350. The embodiments are not limited to these examples.

Figure 5:
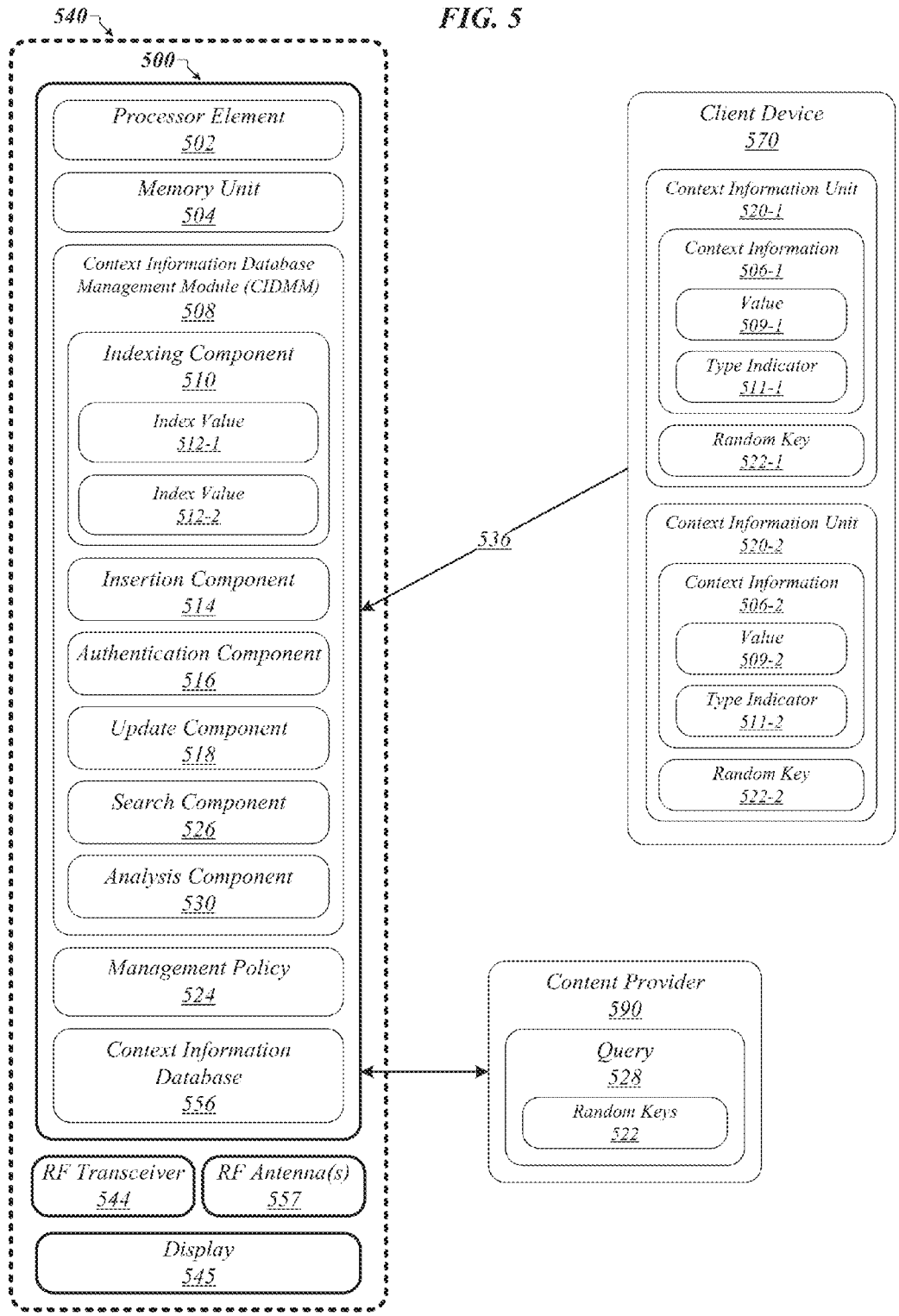
FIG. 5 illustrates one embodiment of a second apparatus and one embodiment of a second system

FIG. 5 illustrates a block diagram of an apparatus 500. More particularly, apparatus 500 may comprise a server that implements improved techniques for management of a context information database 556, and may comprise an example of server 350 of FIG. 3. As shown in FIG. 5, apparatus 500 comprises multiple elements including a processor element 502, a memory unit 504, and a context information database management module 508. Processor element 502 may be implemented using any processor or logic device, and may be the same as or similar to processor element 302 of FIG. 3. Memory unit 504 may be implemented using any machine-readable or computer-readable media capable of storing data, including both volatile and non-volatile memory, and may be the same as or similar to memory unit 304 of FIG. 3. The embodiments are not limited in this context.

In some embodiments, apparatus 500 may comprise a context information database management module (CIDMM) 508. CIDMM may comprise logic, circuitry, and/or instructions operative to incorporate context information 506 into context information database 556. For example, in the embodiment depicted in FIG. 5, apparatus 500 receives context information 506 from client device 570 via trusted link 536, and CIDMM 508 incorporates in into context information database 556. Client device 570 may comprise any device capable of generating context information 506, and may be the same as or similar to apparatus 300 and/or system 340 of FIG. 3. The embodiments are not limited in this context.

FIG. 5 also illustrates a block diagram of a system 540. System 540 may comprise any of the aforementioned elements of apparatus 500. System 540 may further comprise one or more additional components. For example, in various embodiments, system 540 may comprise an RF transceiver 544. RF transceiver 544 may include one or more radios capable of transmitting and receiving signals using various suitable wireless communications techniques, and may be the same as or similar to RF transceiver 344 of FIG. 3. In some embodiments, system 540 may comprise one or more RF antennas 557. Examples of any particular RF antenna 557 may include any of the aforementioned examples of RF antennas 357 of FIG. 3. In various embodiments, system 540 may comprise a display 545. Display 545 may comprise any display device capable of displaying information received from processor element 502, and may be the same as or similar to display 345 of FIG. 3. The embodiments are not limited in this context.

In general operation, apparatus 500 and/or system 540 may be operative to receive context information 506 from one or more client devices and incorporate it into context information database 556. More particularly, apparatus 500 and/or system 540 may be operative to incorporate context information 506 in conjunction with a privacy scheme according to which the context information 506 is de-identified and/or de-correlated. In some embodiments, apparatus 500 and/or system 540 may be operative to generate large-scale statistics and/or metrics by analyzing context information database 556, and/or may be operative to receive and respond to queries for particular context information 506 contained in context information database 556. The embodiments are not limited in this context.

In various embodiments, apparatus 500 and/or system 540 may be operative to receive context information 506 from each of one or more client devices in the form of context information units 520. In some embodiments, each context information unit 520 may comprise an item of context information 506 and a random key 522. For example, in the embodiment depicted in FIG. 5, apparatus 500 receives context information units 520-1 and 520-2 from client device 570. Context information unit 520-1 comprises context information item 506-1 and random key 522-1, and context information unit 520-2 comprises context information item 506-2 and random key 522-2. The embodiments are not limited to this example.

In various embodiments, CIDMM 508 may comprise an indexing component 510. Indexing component 510 may comprise logic, circuitry, and/or instructions operative to generate index values 512 for use in inserting received items of context information 506 into context information database 556. In some embodiments, indexing component 510 may be operative, for each received context information unit 520, to generate an index value 512 based on the random key 522 comprises in that context information unit 520. For example, in the embodiment depicted in FIG. 5, indexing component 510 generates an index value 512-1 based on the random key 522-1 in context information unit 520-1, and generates an index value 512-2 based on the random key 522-2 in context information unit 520-2. The embodiments are not limited to this example.

In various embodiments, context information database 556 may comprise a sparse table or other sparsely populated data structure, and may comprise a very large number of buckets. In some embodiments, for each random key 522, indexing component 510 may be operative to generate an index value 512 that identifies a particular bucket within context information database 556. In various embodiments, the number of buckets in context information database 556 may be the same as the number of unique possible random keys 522 that may be generated by clients from which apparatus 500 and/or system 540 receives context information 506. For example, in some embodiments, each client may generate random keys 522 using a random number generator, such as RNG 310 of FIG. 3, that generates random 256-bit numbers, and context information database 556 may comprise $2^{256}$ buckets. The embodiments are not limited to this example.

In various embodiments, indexing component 510 may be operative to generate index values 512 by applying a hash function to random keys 522. In some embodiments, a simplistic hash function may be employed, according to which the bits of the random keys 522 are directly used as the bits of the index values 512. In various other embodiments, a more complex hash function may be employed that hashes each possible random key 522 to a different index value 512 indirectly. The embodiments are not limited in this context.

In some embodiments, for each context information unit 520 that it receives, CIDMM 508 may be operative to determine whether the associated context information 506 comprises an update of a previously submitted value. In an example, CIDMM 508 may determine that the context information 506-1 in context information unit 520-1 comprises an update of a previously reported location of client device 570, and that the context information 506-2 in context information unit 520-2 comprises a new value indicating a previously unreported gender of a user of client device 570. In various embodiments, CIDMM 508 may perform this determination based on a bit, flag, or other parameter in each context information unit 520. The embodiments are not limited in this context.

In some embodiments, CIDMM 508 may comprise an insertion component 514. Insertion component 514 may comprise logic, circuitry, and/or instructions operative to add received context information 506 to context information database 556. More particularly, insertion component 514 may be operative to insert context information 506 that CIDMM 508 has not identified as comprising updates of previously submitted values. In various embodiments, insertion component 514 may be operative to insert such context information 506 into context information database 556 using index values 512.

In some embodiments, CIDMM 508 may be operative to implement context information database 556 as a table that uses a binary tree structure, according to which the values in context information database 556 are organized as a binary tree of nodes. In various embodiments, insertion component 514 may be operative to traverse the binary tree in order to insert each new item of context information 506 into the table. In some embodiments, for each new item of context information 506, insertion component 514 may be operative to traverse the binary tree based on the bits of the index value 512 for that context information 506. In various embodiments, in traversing the binary tree, insertion component 514 may need to process only as many bits of the index value 512 as are necessary to reach a leaf node.

In a simple example, an index value 512 may comprise a large binary number beginning with the bits '1101.' Insertion component 514 may start with the first bit, '1,' and determine that the binary tree contains multiple nodes comprising a first bit equal to '1.' Insertion component 514 may then proceed to the second bit, '1,' and determine that the binary tree contains multiple nodes for which the two first bits are equal to '11.' Similarly, insertion component 514 may determine that the binary tree contains multiple nodes for which the first three bits are equal to '110.' However, when it processes the fourth bit of the index value 512, which is a '1,' insertion component 514 may determine that the binary tree does not contain any node for which the first four bits are equal to '1101.' Based on this determination, insertion component 514 may add a leaf node to the binary tree to represent the bits '1101,' and may insert the context information 506 into the table in a position between the values corresponding to the nodes on either side of the new leaf node in the binary tree. The embodiments are not limited to this example.

One advantage associated with some embodiments may be that only as many bits of index values 512 are analyzed as are necessary to determine the appropriate placement of the correspond context information 506. For example, rather than unnecessarily analyzing all of the 256 bits of a given index value 512, insertion component 514 may determine the appropriate placement of corresponding context information 506 based on a substantially smaller subset of bits at the beginning of the index value 512. This may significantly reduce the computational overhead associated populating context information database 556 with new values. Furthermore, it may enable index creation to be performed dynamically during normal system operation, rather than requiring the use of a quiescent phase during which data cannot be updated or queried. Other advantages may be associated with various embodiments, and the embodiments are not limited in this context.

In some embodiments, each time it inserts an item of context information 506 into context information database 556, insertion component 514 may be operative to determine whether a bucket identified by an index value 512 for the item of context information 506 is empty. If the bucket is empty, insertion component 514 may be operative to populate the bucket with the item of context information 506, including its value 509 and its type indicator 511. As noted above, in various embodiments, context information database 556 may comprise a sparse table or other sparsely populated data structure, and may comprise a very large number of buckets, such as $2^{256}$ buckets. In such embodiments, the probability that an identified bucket will not be empty may be very low, but greater than zero. As such, although it may be rare that insertion component 514 encounters a collision between a new item of context information 506 to be inserted into a particular bucket and an item of context information 506 already contained in the bucket, such collisions may potentially occur.

In some embodiments, such collisions may occur more frequently if CIDMM 508 is configured to accept context information 506 from devices that are not capable of generating truly random numbers of the size used to implement index values 512 for context information database 556. For example, in various embodiments, context information database 556 may be maintained in conjunction with a business model that requires interoperability with clients that possess "rogue" RNGs that are not capable of generating very large truly random numbers. Such clients may tend to generate particular "random" keys 522 more frequently and others less frequently or not at all, and collisions may tend to occur at buckets corresponding to the more frequently generated keys.

In some embodiments, in order to address this issue, CIDMM 508 may comprise an authentication component 516. Authentication component 516 may comprise logic, circuitry, and/or instructions operative to attest the RNGs of clients submitting random keys 522 that result in collisions. In various embodiments, when a collision occurs, authentication component 516 may be operative to establish a secure, anonymous connection to the client submitting the random key 522 that results in the collision. In some embodiments, for example, authentication component 516 may be operative to establish an enhanced privacy identifier (EPID)-signed sigma protocol connection with the client.

In various embodiments, authentication component 516 may be operative to obtain information describing the RNG and/or record collection software that the client uses to determine its random keys, and may vet the client based on this information. In some embodiments, for example, authentication component 516 may be operative to vet the client based on a comparison of the client's RNG and/or record collection software with a whitelist of known acceptable implementations. If the client's RNG and/or record collection software matches an implementation in the whitelist, authentication component 516 may authenticate the random key 522 and the context information 506 with which it is associated. Otherwise, authentication component 516 may regard the random key 522 and associated context information 506 as unauthenticated. The embodiments are not limited in this context.

In various embodiments, insertion component 514 may be operative to resolve collisions based on information provided by authentication component 516 and based on a management policy 524. Management policy 524 may comprise information defining one or more rules for how context information 506 is to be handled by CIDMM 508. In some embodiments, management policy 524 may define one or more rules for handling collisions. In various embodiments, for example, management policy 524 may specify whether unauthenticated context information 506 may be added to a bucket in context information database 556 that already contains information. In some embodiments, management policy 524 may additionally or alternatively specify whether multiple items of context information 506 of a same type may be stored in a same bucket in context information database 556. The embodiments are not limited to these examples.

Figure 6:
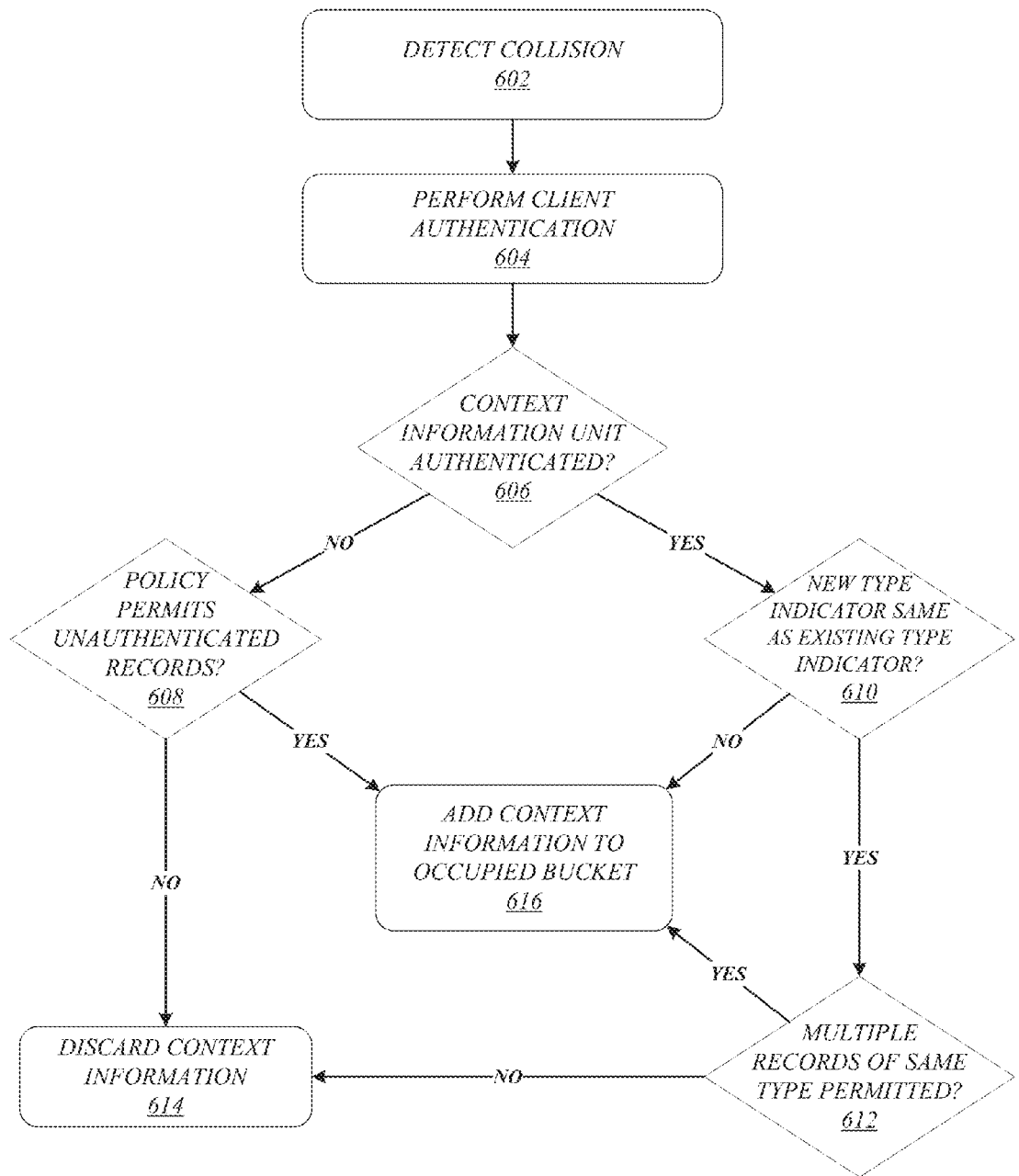
FIG. 6 illustrates one embodiment of a second logic flow.

In various embodiments, authentication component 516 may be operative to utilize a collision-handling process in order to resolve record collisions. FIG. 6 illustrates a logic flow 600 that may comprise an example of such a collision-handling process. As shown in FIG. 6, a collision may be detected at 602. For example, CIDMM 508 of FIG. 5 may receive context information unit 520-1 from client device 570, and insertion component 514 may determine index value 512-1 based on random key 522-1 and determine that the bucket in context information database 556 that corresponds to index value 512-1 is not empty. At 604, client authentication may be performed for the client submitting the colliding context information unit. For example, authentication component 516 of FIG. 5 may vet client device 570 based on its RNG and/or record collection software, and may either authenticate or not authenticate context information unit 520-1 based on the result.

At 606, it may be determined whether the context information unit has been authenticated. If the context information unit has not been authenticated, flow may pass to 608. At 608, it may be determined whether a management policy permits the addition of unauthenticated records to occupied buckets in the context information database. For example, insertion component 514 of FIG. 5 may determine whether management policy 524 permits the addition of unauthenticated context information to occupied buckets in context information database 556. If it is determined that the management policy does not permit the addition of unauthenticated records to occupied buckets in the context information database, flow may pass to 614, where the received context information may discarded and the logic flow may end. If it is determined that the management policy does permit the addition of unauthenticated records to occupied buckets in the context information database, flow may pass to 616, where the received context information may be marked as unauthenticated and added to the occupied bucket, and the logic flow may end. If it is determined, at 606, that the context information unit is authenticated, flow may pass directly to 610.

At 610, it may be determined whether the received context information is of a same type as that occupying the identified bucket in the context information database. For example, insertion component 514 of FIG. 5 may be operative to determine whether type indicator 511-1 is the same as a type indicator for the context information 506 occupying the identified bucket in context information database 556. If it is determined that the received context information is not of the same type as that occupying the identified bucket, flow may pass to 616, where the received context information may be marked as authenticated and added to the occupied bucket, and the logic flow may end. If it is determined at 610 that the received context information is of the same type as that occupying the identified bucket, flow may pass to 612.

At 612, it may be determined whether the management policy permits the storage of multiple records of a same type in a same bucket of the context information database. For example, insertion component 514 of FIG. 5 may determine whether management policy 524 permits any particular bucket in context information database 556 to contain multiple items of context information 506 of a same type. If it is determined that the management policy does not permit the storage of multiple records of a same type in a same bucket, flow may pass to 614, where the received context information may discarded and the logic flow may end. If it is determined that the management policy does permit the storage of multiple records of a same type in a same bucket, flow may pass to 616, where the received context information may be marked as authenticated and added to the occupied bucket, and the logic flow may end. The embodiments are not limited to the aforementioned examples.

Returning to FIG. 5, in some embodiments, CIDMM 508 may comprise an update component 518. Update component 518 may comprise logic, circuitry, and/or instructions operative to update context information database 556 with context information 506 that CIDMM 508 has identified as comprising updates of previously submitted values 509. In various embodiments, for particular context information 506 that comprises an update of a previously submitted value 509, update component 518 may be operative to use the index value 512 associated with that context information 506 to determine the location of the previously submitted value 509 within context information database 556. In some embodiments, once update component 518 has determined the location of the previously submitted value 509, it may replace the previously submitted value 509 with the updated value 509 comprised in the context information 506. The embodiments are not limited in this context.

In various embodiments, CIDMM 508 may comprise a search component 526. Search component 526 may comprise logic, circuitry, and/or instructions operative to locate and return context information 506 in response to queries 528. In some embodiments, any particular query 528 may comprise one or more random keys 522. In various embodiments, an entity to which a client has granted access to some or all of its particular context information 506 may submit a query 528 comprising client-provided random keys 522 corresponding to that context information 506. For example, if client 570 has granted content provider 590 access to context information 506-1 and 506-2, content provider 590 may send a query 528 comprising random keys 522-1 and 522-2. Upon receipt of a query 528, indexing component 510 may be operative to determine corresponding index values 512 for each of the one or more random keys 522 in the query 528. Search component 526 may then identify the buckets in context information database 556 that correspond to those index values 512, and return the context information 506 contained in the identified buckets. In some embodiments, in which context information database 556 is implemented using a binary tree structure, search component 526 may be operative to locate each item of context information 506 by traversing the binary tree based on the bits of the respective index value 512. The embodiments are not limited in this context.

In various embodiments, CIDMM 508 may comprise an analysis component 530. Analysis component 530 may comprise logic, circuitry, and/or instructions operative to perform "big data" analysis on the information in context information database 556 in order to generate large-scale statistics and/or metrics describing preferences, characteristics, behaviors, trends, and/or other parameters associated with a client/user community tracked by context information database 556. In some embodiments, analysis component 530 may be operative to build datasets for such analysis on an ongoing basis, using the type indicators 511 comprised in the various submitted context information 506. More particularly, analysis component 530 may be operative to create dedicated indices for various information types, and may key the dedicated indices off of the type indicators 511 for context information 506. In various embodiments, such big data analysis may be performed independently from database updating and/or querying, using spare database cycles. As a result, database updating and/or querying may be performed quickly and may readily scale to millions of client connections. Other advantages may be associated with some embodiments, and the embodiments are not limited in this context.

Figure 7:
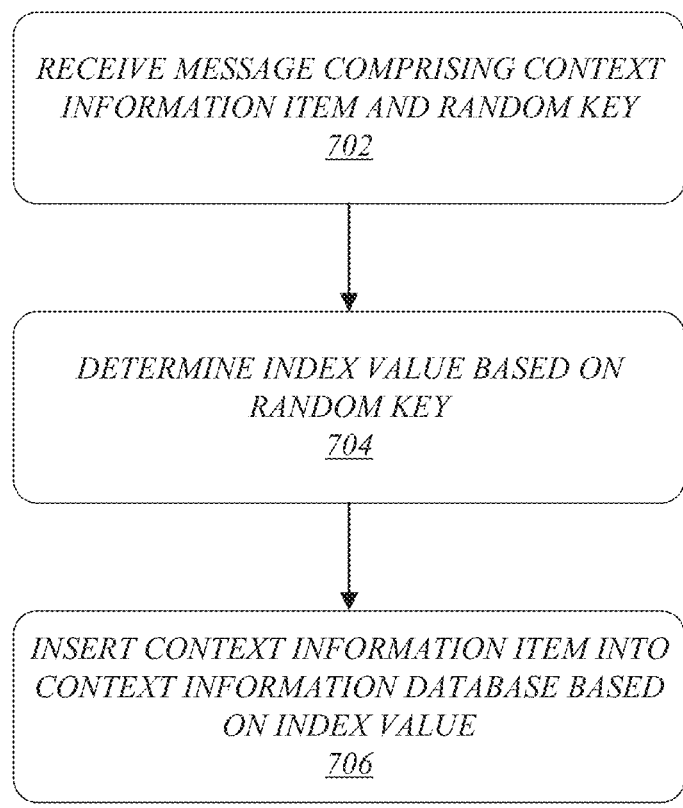
FIG. 7 illustrates one embodiment of a third logic flow.

FIG. 7 illustrates one embodiment of a logic flow 700, which may be representative of the operations executed by one or more embodiments described herein. More particularly, logic flow 700 illustrates an example of a process that may be performed by apparatus 500 and/or system 540 of FIG. 5 in various embodiments. As shown in logic flow 700, a message comprising a context information item and a random key may be received at 702. For example, apparatus 500 and/or system 540 of FIG. 5 may be operative to receive a context information unit 520 from client device 570. At 704, an index value for the context information item may be determined based on the random key. For example, indexing component 510 of FIG. 5 may be operative to determine an index value 512 for a context information item 506 based on a random key 522. At 706, the context information item may be inserted into a context information database based on the index value. For example insertion component 514 of FIG. 5 may be operative to insert the context information 506 into a bucket within context information database 556 based on the index value 512. The embodiments are not limited to these examples.

In some embodiments, it may be desirable for an entity that maintains a context information database such as context information database 556 of FIG. 5 to do so in conjunction with an ontology scheme. In various embodiments, the use of an ontology scheme may enable data providers to enhance their datasets by using semantic markup to provide a framework for understanding the interrelationships between context information items. Such a framework may provide a basis upon which applications previously unfamiliar with a dataset may perform reasoning based on the data. The embodiments are not limited in this context.

Figure 8:
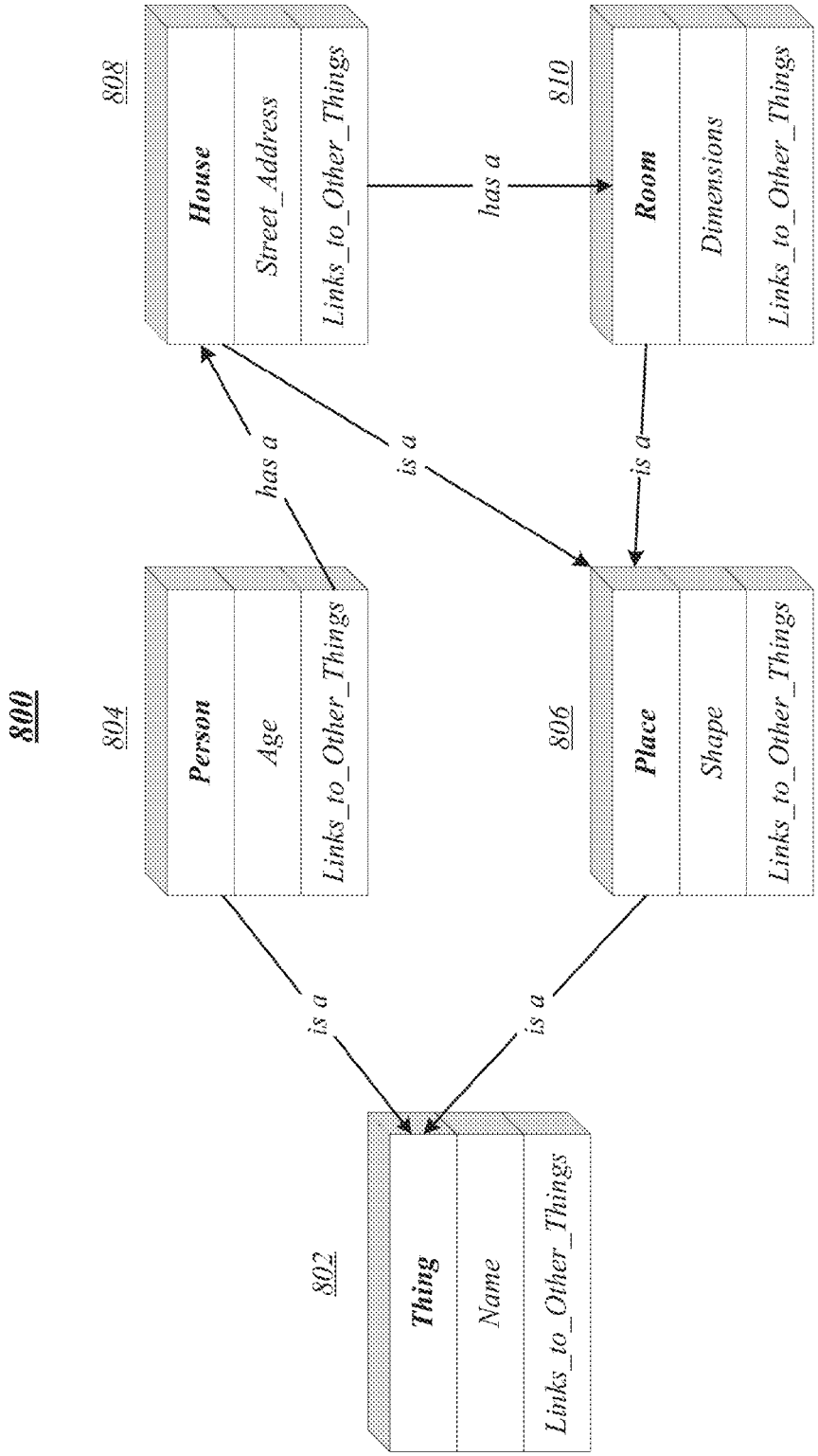
FIG. 8 illustrates one embodiment of a first ontology scheme.

FIG. 8 illustrates an embodiment of an ontology scheme 800 such as may be representative of some such embodiments. As shown in FIG. 8, ontology scheme 800 comprises a hierarchy of interrelated information items that relates more detailed information to progressively more general notions of that information using a logical arrangement of information objects. Any particular information object may have associated attributes, and may inherit some or all of those attributes from a related information object.

At a root level, the ontology scheme 800 comprises a Thing object 802, which may constitute a highest level of abstraction for the information in the ontology scheme 800. As shown, a Thing may comprise a Name attribute, and may be capable of being related to other Things via one or more Links_to_Other_Things. Since each other object in ontology scheme 800 is a type of Thing, each other object may also comprise a Name attribute, and may also be capable of being related to other Things via one or more Links_to_Other_Things. For example, Person object 804 is a Thing, may comprise a Name attribute and an Age attribute, and is related to House object 808 via a Links_to_Other_Things element indicating that a Person may have a House. Place object 806 is a second type of Thing on a same abstraction level as Person object 804, and may comprise a Name attribute and a Shape attribute.

House object 808 and Room object 810, although they are both related to Person object 804, both comprise Places rather than Persons. House object 808 is a Place and thus a Thing, may comprise a Name attribute, a Shape attribute, and a Street_Address attribute, and may be related to Room object 810 via a Links_to_Other_Things element indicating that that a House may have a Room. Room object 810 is a Place and thus a Thing, and may comprise a Name attribute, a Shape attribute, and a Dimensions attribute. The embodiments are not limited to these examples.

When an ontology scheme such as that of FIG. 8 is implemented in conjunction with the storage of context information in a context information database, various interrelated records in the database may comprise personal and/or sensitive information pertaining to a same client and/or user. In various embodiments, it may be desirable for a client or user to permit an entity to view a subset of that personal information, and to understand the relationships between the various records in that subset, but not to grant the entity access to all of the client or users personal information in the database. As such, in some embodiments, it may be desirable for a client or user to have the ability to grant access to some objects and/or attribute values of the ontology while withholding access to other objects and/or attribute values. For example, it may be desirable for a user to enable an entity to view an Age attribute value of a Person object representing the user and a Dimensions attribute value of a Room object associated with the user via a House object, but not to enable the entity to view a Name attribute value of the Person object representing the user or a Street_Address attribute value of the House object associated with the user. The embodiments are not limited to this example.

Figure 9:
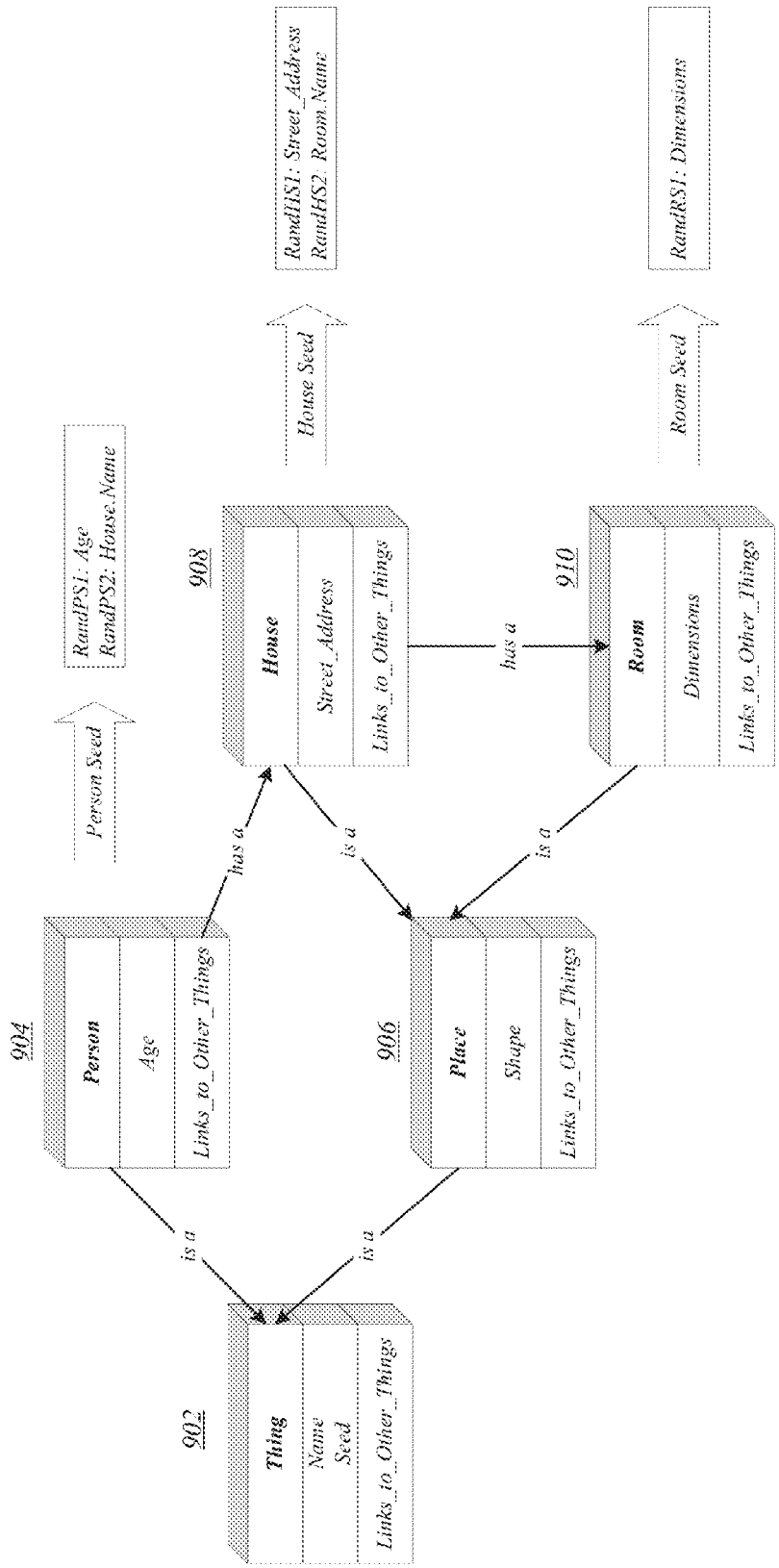
FIG. 9 illustrates one embodiment of a second ontology scheme.

FIG. 9 illustrates an example of an ontology scheme 900 that may be implemented in order to enable such access customization in various embodiments. As shown in FIG. 9, ontology scheme 900 comprises Thing, Person, Place, House, and Room objects 902, 904, 906, 908, and 910 that are similar to the respective objects 802, 804, 806, 808, and 810 in ontology scheme 800 of FIG. 8. However, in ontology scheme 900 of FIG. 9, Thing object 902 comprises a Seed attribute. For the Thing object 902, this Seed attribute may be populated with a value comprising a large random number, such as may be generated by RNG 310 of FIG. 3. In some embodiments, for example, the Seed attribute may be populated with a random 128-bit or 256-bit number. The embodiments are not limited in this context.

Since Person object 904 is a Thing, it comprises a Seed attribute. For Person object 904, a value may be obtained from a seeded pseudorandom number generator using a starting seed equal the Seed value for Thing object 902, and the Seed attribute for Person object 904 may be populated with the obtained value. A similar process may be used to populate the Seed attributes of Place, House, and Room objects, 906, 908, and 910, wherein the Seed attribute of a given object is populated with a pseudorandom value obtained using the Seed attribute value of the object's parent in the ontology scheme. The embodiments are not limited in this context.

In various embodiments, the various objects in ontology scheme 900 may utilize their respective Seed attribute values to generate pseudorandom numbers for use as random keys to be submitted along with various items of context information, such as random keys 322 to be submitted along with items of context information 306 in FIG. 3. In the example depicted in FIG. 9, the Person Seed is used to generate random keys RandPS1 and RandPS2, which correspond to an age and a house name, respectively. Similarly, the House Seed is used to generate random keys RandHS1 and RandHS2, which correspond to a street address and a room name, respectively. Finally, the Room Seed is used to generate a random key RandRS1, which corresponds to the dimensions of a room. The embodiments are not limited to these examples.

When an ontology scheme such as that of FIG. 9 is implemented, clients and/or users may customize the levels of access to their personal information that they grant to various entities, via their selection of the random keys that they provide those entities. For example, a particular user may provide a trusted entity with a random key comprising a Person Seed attribute value. Assuming that the trusted entity is aware of the pseudorandom number generation algorithm employed by the ontology scheme 900, it may use the Person Seed attribute value to determine the Seed values for other objects associated with the user, and may in turn determine each of the random keys RandPS1, RandPS2, PandHS1, RandHS2, and RandRS1 and use them to retrieve their corresponding context information. The same user may provide an untrusted entity with only the random key RandPS1. The untrusted entity may use that random key to determine the age of the user, but will be unable to use it to obtain any other information. The embodiments are not limited to these examples.

Figure 10:
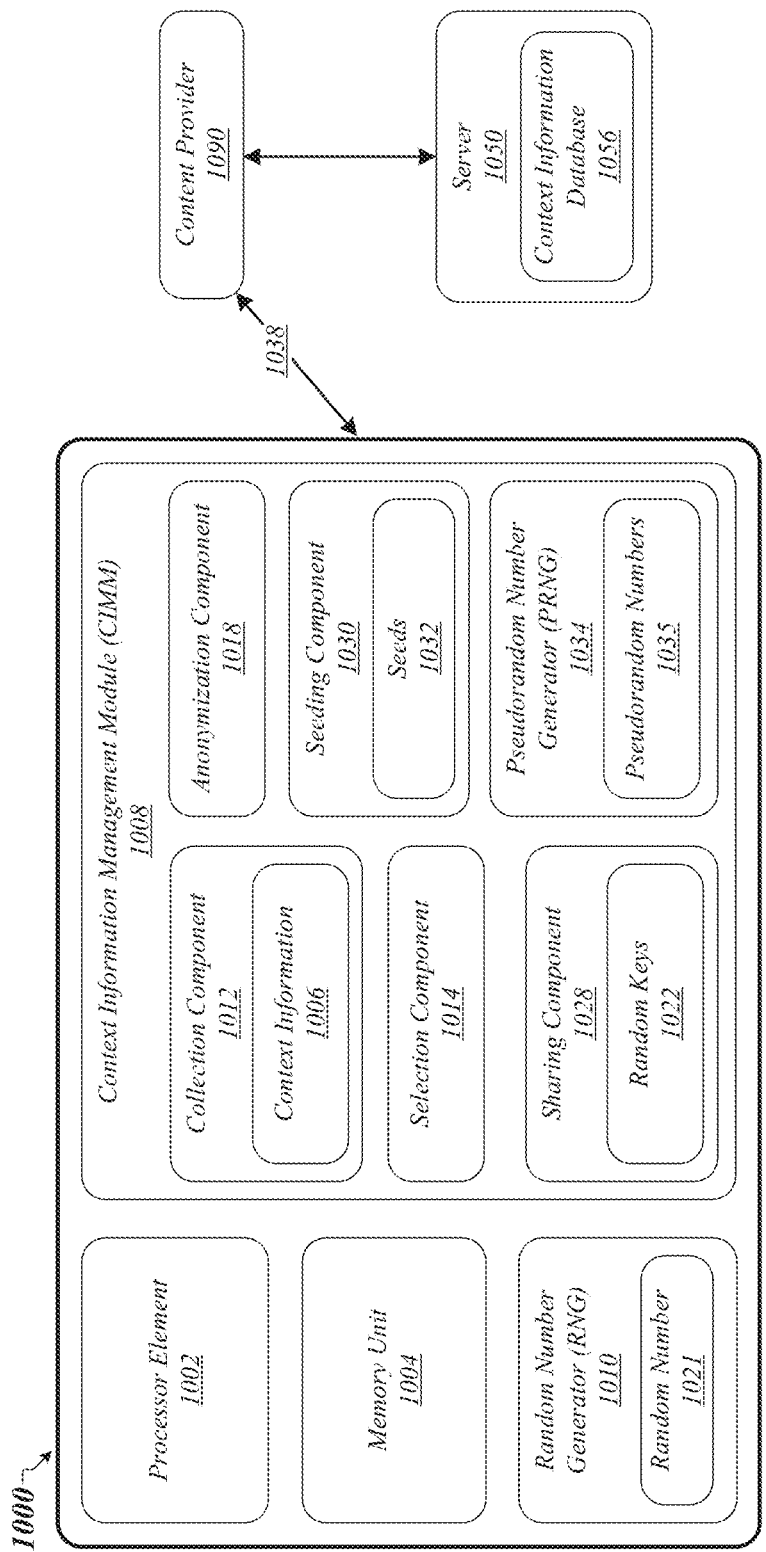
FIG. 10 illustrates one embodiment of a third apparatus.

FIG. 10 illustrates an apparatus 1000 such as may be operative to enable a user to customize the level and nature of access to personal information in conjunction with an ontology scheme such as that of FIG. 9. Many of the elements comprised in apparatus 1000 may be the same as or similar to those comprised in apparatus 300 and/or system 340 of FIG. 3. For purposes of brevity, and clarity, some such elements are omitted from FIG. 10 and the description that follows. However, it is to be understood that the components of apparatus 1000 may not be limited to those depicted in FIG. 10. It is to be further understood that in various embodiments, apparatus 1000 may be comprised within a system, which may also comprise components that are the same as or similar to RF transceiver 344, RF antennas 357, and/or display 345 of FIG. 3. The embodiments are not limited in this context.

As shown in FIG. 10, apparatus 1000 comprises multiple elements, including a processor element 1002, a memory unit 1004, a context information management module (CIMM) 1008, and a random number generator (RNG) 1010. Processor element 1002 may be implemented using any processor or logic device, and may be the same as or similar to processor element 302 of FIG. 3. Memory unit 1004 may be implemented using any machine-readable or computer-readable media capable of storing data, including both volatile and non-volatile memory, and may be the same as or similar to memory unit 304 of FIG. 3. RNG 1010 may comprise logic, circuitry, and/or instructions operative to generate random numbers for use by CIMM 1008, and may be the same as or similar to RNG 310 of FIG. 3.

In some embodiments, apparatus 1000 may comprise CIMM 1008, which may be similar to CIMM 308 of FIG. 3, and may comprise a collection component 1012, a selection component 1014, an anonymization component 1018, and/or a sharing component 1028, each of which are similar to the respective components in apparatus 300 of FIG. 3. However, in various embodiments, CIMM 1008 may additionally comprise a seeding component 1030. Seeding component 1030 may comprise logic, circuitry, and/or instructions operative to generate, maintain, and/or track one or more seeds 1032 for use in generating random keys 1022 in conjunction with an ontology scheme, such as ontology scheme 900 of FIG. 9. In some embodiments, seeding component 1030 may be operative to determine seeds 1032 based on the interrelationships between various items of context information 1006 according to the ontology scheme. In various embodiments, seeding component 1030 may be operative to determine such interrelationships based on type indicators for the various items of context information 1006. In some embodiments, seeds 1032 may comprise very large numbers, such as 128-bit and/or 256-bit numbers. In various embodiments, seeds 1032 may comprise a same length as random numbers 1021 generated by RNG 1010. The embodiments are not limited in this context.

In some embodiments, apparatus 1000 may comprise a pseudorandom number generator (PRNG) 1034. In various embodiments, PRNG 1034 may comprise logic, circuitry, and/or instructions operative to generate pseudorandom numbers 1035 based on seeds 1032. In some embodiments, PRNG 1034 may be operative to generate pseudorandom numbers 1035 by using seeds 1032 as starting seeds for a pseudorandom number generation algorithm. In various embodiments, pseudorandom numbers 1035 may comprise very large numbers, such as 128-bit and/or 256-bit numbers. In some embodiments, seeds 1032 may comprise a same length as random numbers 1021 generated by RNG 1010 and/or seeds 1032. The embodiments are not limited in this context.

In various embodiments, rather than using a new random number 1021 to obtain a random key 1022 for each item of context information 1006 that it prepares for submission to a context information database 1056, anonymization component 1018 may be operative to use a single random number 1021 to obtain successive pseudorandom numbers 1035 for use as random keys 1022. More particularly, in some embodiments, anonymization component 1018 may be operative, in conjunction with seeding component 1030, to use the random number 1021 as a random master seed 1032 for a pseudorandom number generation algorithm implemented by PRNG 1034. Depending on the structure of the underlying ontology scheme, seeding component 1030 may be operative to generate one or more additional seeds 1032 corresponding to objects that inherit from the highest level object associated with the random master seed 1032, by obtaining pseudorandom numbers 1035 from PRNG 1034 using the master seed 1032 and any intermediate seeds 1032. In various embodiments, anonymization component 1018 may be operative, for each item of context information 1006, to obtain a pseudorandom number 1035 from PRNG 1034 using the seed 1032 corresponding to the type of object that the context information 1006 describes, and may use the pseudorandom number 1035 as the random key 1022 for that item of context information 1006.

In some embodiments, in order to share context information 1006 with a content provider 1090, sharing component 1028 may be operative to send one or more random keys 1022 and/or seeds 1032 to content provider 1090 via untrusted link 1038. In various embodiments, in order to share a single item of context information 1006, sharing component 1028 may be operative to send a random key 1022 comprising the pseudorandom number 1035 that was used by anonymization component 1018 in storing the item of context information 1006 in context information database 1056. In some embodiments, sharing component 1028 may be operative to share multiple items of context information 1006 by sending multiple such random keys 1022.

However, in various embodiments, the use of the single random number 1021 to generate seeds 1032 according to the structure of the ontology scheme may enable sharing component 1028 to share multiple items of context information 1006 without having to provide multiple random keys 1022, or even any random keys 1022. For example, in some embodiments, sharing component 1028 may be operative to share a plurality of items of context information 1006 by sending a single seed 1032, using which the recipient can derive the pseudorandom numbers 1035 used to store the various items of context information 1006. For example, sharing component 1028 may be operative to send to content provider 1090 a single seed 1032 comprising the Person Seed attribute value for a person object such as Person object 904 of FIG. 9. Content provider 1090 may apply a same pseudorandom number generation algorithm as that implemented by PRNG 1034 to reconstruct the pseudorandom numbers 1035 that anonymization component 1018 used to store the various items of context information 1006 in context information database 1056, and may use them to retrieve the various items of context information 1006. The embodiments are not limited to this example.

In some embodiments, seeds 1032 may additionally or alternatively be used to enable an external device to submit context information 1006 on behalf of apparatus 1000. In various embodiments, sharing component 1028 may be operative to provide such a device with one or more seeds 1032, and the device may generate random keys by applying the seeds 1032 to a same pseudorandom number sequence as that embodied by PRNG 1034. The device may then submit context information using the generated random keys, and since those keys correspond to the seeds 1032 provided by apparatus 1000, the submitted context information will correspond to apparatus 1000. In an example embodiment, apparatus 1000 may comprise a personal computer, and may communicate with a GPS-equipped smartphone via a WPAN connection. In this example, apparatus 1000 may provide the smartphone with one or more seeds 1032 so that the smartphone can submit GPS location information on behalf of apparatus 1000. The embodiments are not limited to this example.

Figure 11:
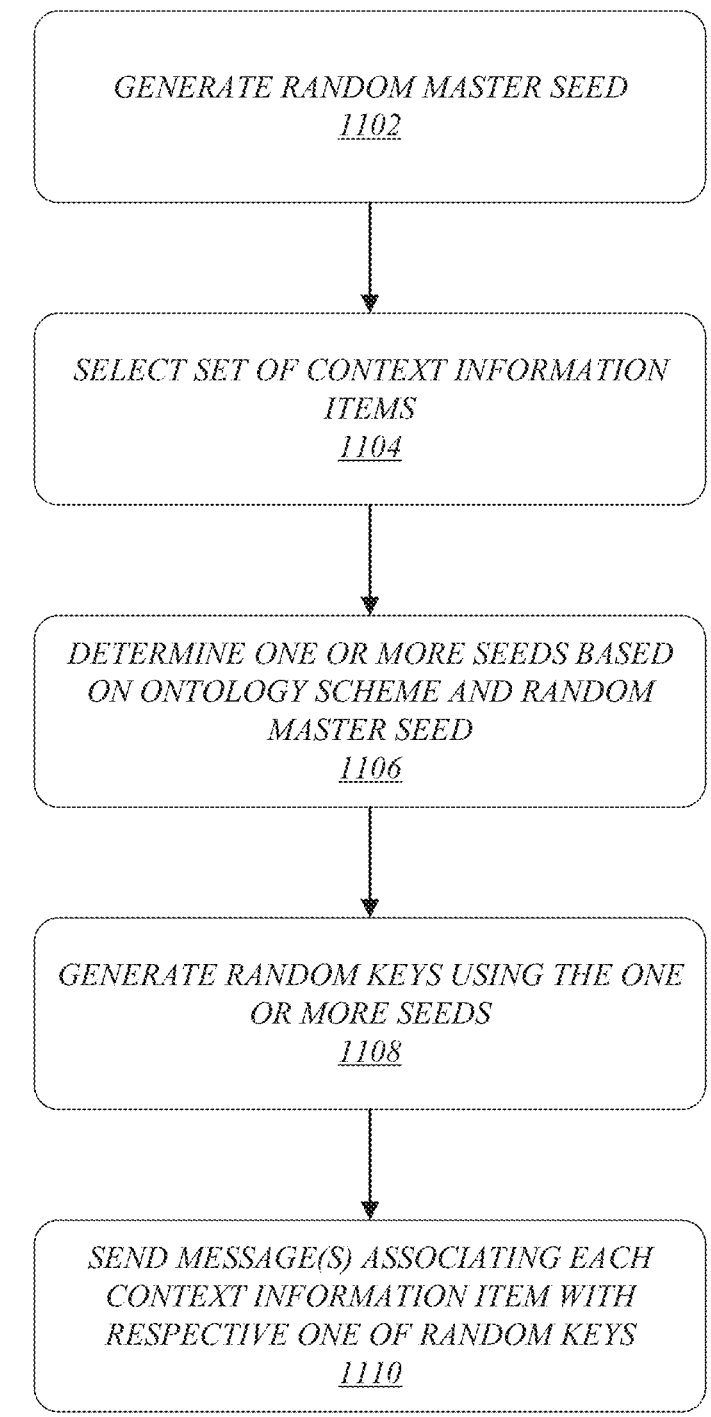
FIG. 11 illustrates one embodiment of a fourth logic flow.

FIG. 11 illustrates one embodiment of a logic flow 400, which may be representative of the operations executed by one or more embodiments described herein. More particularly, logic flow 1100 illustrates an example of a process that may be performed by apparatus 1000 of FIG. 10 when submitting context information 1006 for incorporation into context information database 1056 in conjunction with an ontology scheme such as ontology scheme 900 of FIG. 9. As shown in logic flow 1100, a random master seed may be generated at 1102. For example, RNG 1010 of FIG. 10 may be operative to generate a random number 1021, and seeding component 1030 may use the random number 1021 as a master seed 1032. At 1104, a set of context information items may be selected. For example, selection component 1014 of FIG. 10 may be operative to select a set of context information items 1006 from among those collected by collection component 1012.

At 1106, one or more seeds may be determined based on an ontology scheme and the random master seed. For example, seeding component 1030 of FIG. 10 may be operative to determine one or more additional seeds 1032 by obtaining pseudorandom numbers 1035 from PRNG 1034 using the random master seed 1032, and the one or more additional seeds 1032 may correspond to various object types in an ontology scheme. At 1108, random keys may be generated using the one or more seeds. For example, anonymization component 1018 of FIG. 10 may be operative to generate random keys 1022 by obtaining pseudorandom numbers 1035 from PRNG 1034 using the one or more additional seeds 1032. At 1100, a message may be sent that associates each of the set of context information items with a respective one of the random keys. For example, anonymization component 1018 of FIG. 10 may be operative to generate context information units comprising the items of context information 1006 and the random keys 1022, and apparatus 1000 may be operative to send one or more messages collectively comprising the context information units. The embodiments are not limited to these examples.

Figure 12:
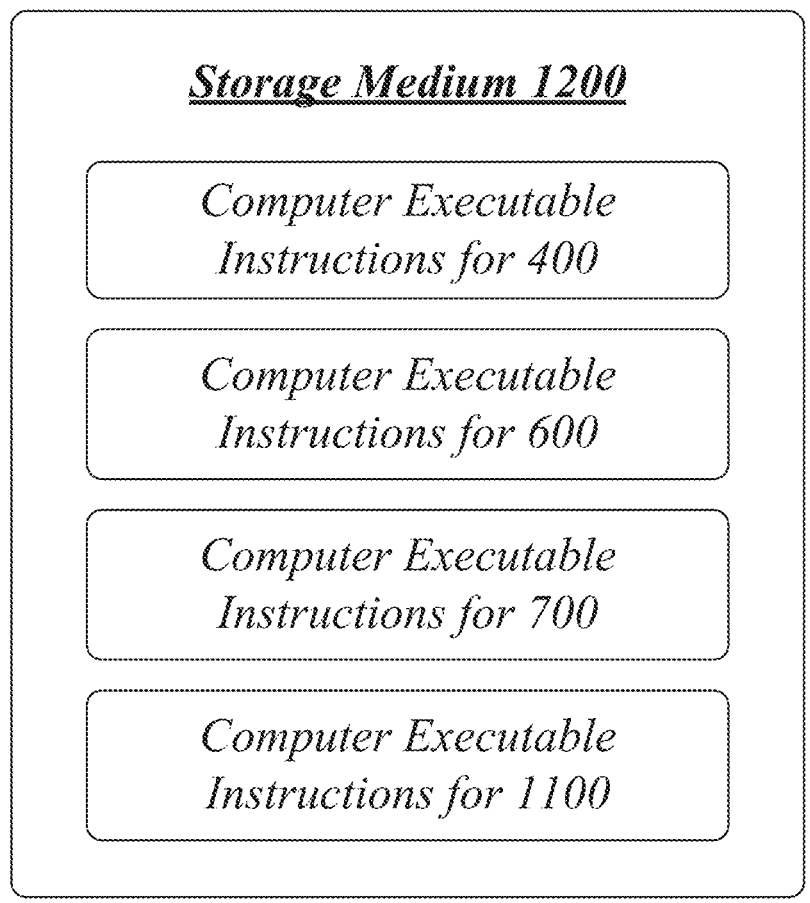
FIG. 12 illustrates one embodiment of a storage medium.

FIG. 12 illustrates an embodiment of a storage medium 1200. Storage medium 1200 may comprise any non-transitory computer-readable storage medium or machine-readable storage medium, such as an optical, magnetic or semiconductor storage medium. In various embodiments, storage medium 1200 may comprise an article of manufacture. In some embodiments, storage medium 1200 may store computer-executable instructions, such as computer-executable instructions to implement one or more of logic flow 400 of FIG. 4, logic flow 600 of FIG. 6, logic flow 700 of FIG. 7, and logic flow 1100 of FIG. 11. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 13:
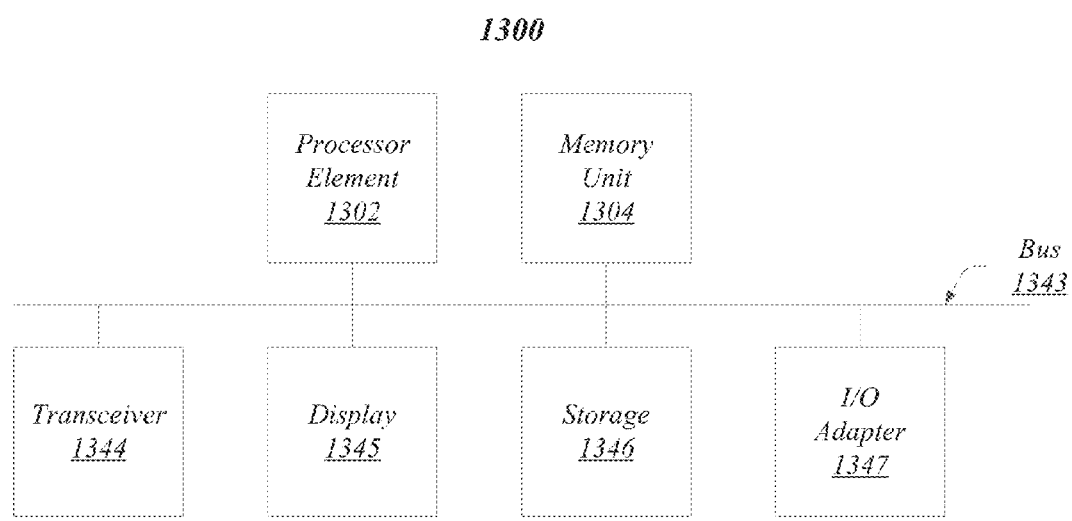
FIG. 13 illustrates one embodiment of a third system.

FIG. 13 illustrates one embodiment of a system 1300. In various embodiments, system 1300 may be representative of a system or architecture suitable for use with one or more embodiments described herein, such as apparatus 300 and/or system 340 of FIG. 3, logic flow 400 of FIG. 4, apparatus 500 and/or system 540 of FIG. 5, logic flow 600 of FIG. 6, logic flow 700 of FIG. 7, apparatus 1000 of FIG. 10, logic flow 1100 of FIG. 11, and/or storage medium 1200 of FIG. 12. The embodiments are not limited in this respect.

As shown in FIG. 13, system 1300 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 1300 as desired for a given implementation. The embodiments are not limited in this context.

In various embodiments, system 1300 may include a processor element 1302. Processor element 1302 may be implemented using any processor or logic device, and may be the same as or similar to processor element 302 of FIG. 3.

In one embodiment, system 1300 may include a memory unit 1304 to couple to processor element 1302. Memory unit 1304 may be coupled to processor element 1302 via communications bus 1343, or by a dedicated communications bus between processor element 1302 and memory unit 1304, as desired for a given implementation. Memory unit 1304 may be implemented using any machine-readable or computer-readable media capable of storing data, including both volatile and non-volatile memory, and may be the same as or similar to memory unit 304 of FIG. 3. In some embodiments, the machine-readable or computer-readable medium may include a non-transitory medium. The embodiments are not limited in this context.

In various embodiments, system 1300 may include an RF transceiver 1344. RF transceiver 1344 may include one or more radios capable of transmitting and receiving signals using various suitable wireless communications techniques, and may be the same as or similar to RF transceiver 344 of FIG. 3.

In various embodiments, system 1300 may include a display 1345. Display 1345 may comprise any display device capable of displaying information received from processor element 1302, and may be the same as or similar to display 345 of FIG. 3. The embodiments are not limited in this context.

In various embodiments, system 1300 may include storage 1346. Storage 1346 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1346 may include technology to increase the storage performance enhanced protection for valuable digital media when multiple hard drives are included, for example. Further examples of storage 1346 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1300 may include one or more I/O adapters 1347. Examples of I/O adapters 1347 may include Universal Serial Bus (USB) ports/adapters, IEEE 1394 Firewire ports/adapters, and so forth. The embodiments are not limited in this context.

Figure 14:
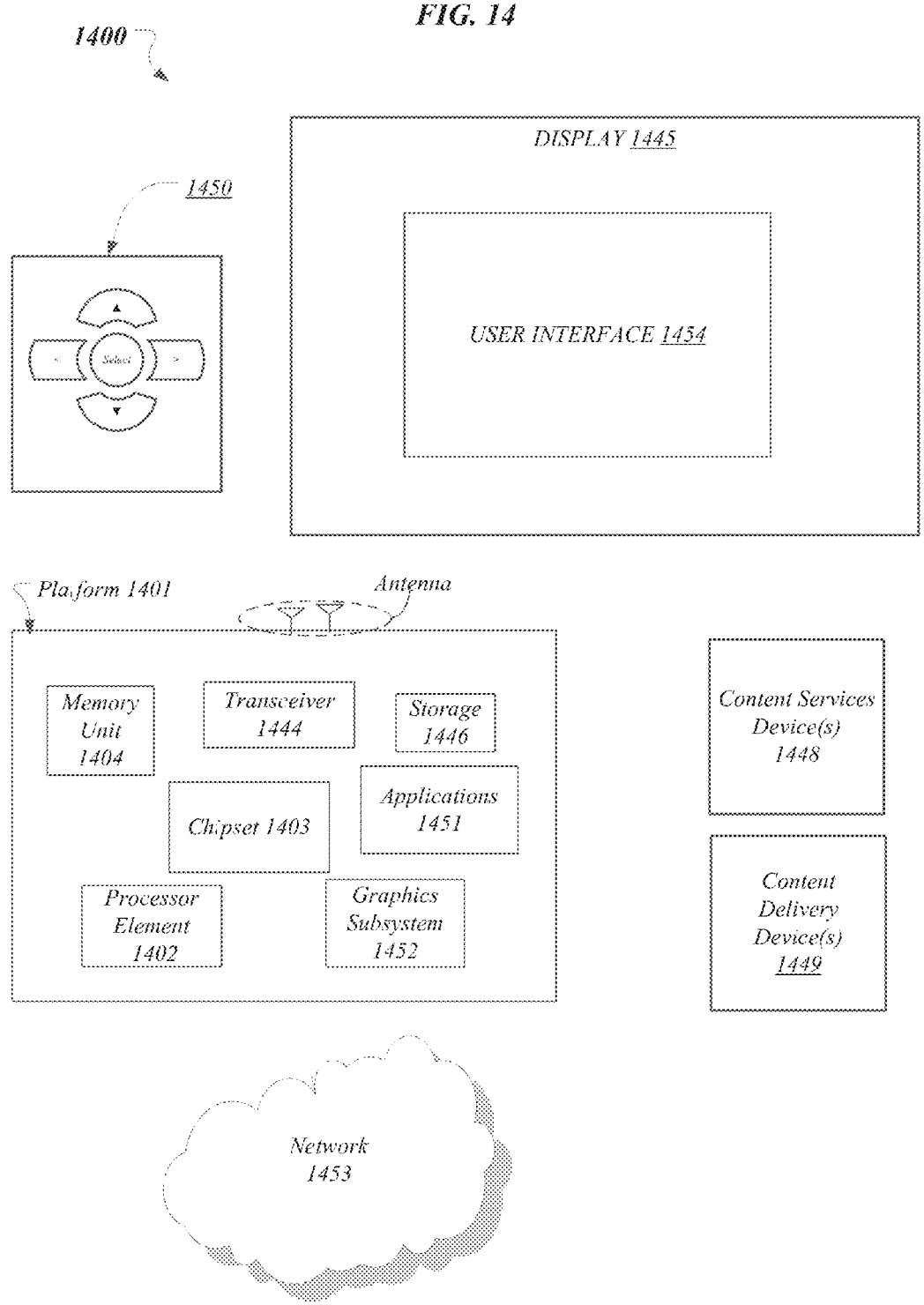
FIG. 14 illustrates one embodiment of a fourth system.

FIG. 14 illustrates an embodiment of a system 1400. In various embodiments, system 1400 may be representative of a system or architecture suitable for use with one or more embodiments described herein, such as apparatus 300 and/or system 340 of FIG. 3, logic flow 400 of FIG. 4, apparatus 500 and/or system 540 of FIG. 5, logic flow 600 of FIG. 6, logic flow 700 of FIG. 7, apparatus 1000 of FIG. 10, logic flow 1100 of FIG. 11, storage medium 1200 of FIG. 12, and/or system 1300 of FIG. 13. The embodiments are not limited in this respect.

As shown in FIG. 14, system 1400 may include multiple elements. One or more elements may be implemented using one or more circuits, components, registers, processors, software subroutines, modules, or any combination thereof, as desired for a given set of design or performance constraints. Although FIG. 14 shows a limited number of elements in a certain topology by way of example, it can be appreciated that more or less elements in any suitable topology may be used in system 1400 as desired for a given implementation. The embodiments are not limited in this context.

In embodiments, system 1400 may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1400 includes a platform 1401 coupled to a display 1445. Platform 1401 may receive content from a content device such as content services device(s) 1448 or content delivery device(s) 1449 or other similar content sources. A navigation controller 1450 including one or more navigation features may be used to interact with, for example, platform 1401 and/or display 1445. Each of these components is described in more detail below.

In embodiments, platform 1401 may include any combination of a processor element 1402, chipset 1403, memory unit 1404, transceiver 1444, storage 1446, applications 1451, and/or graphics subsystem 1452. Chipset 1403 may provide intercommunication among processor element 1402, memory unit 1404, transceiver 1444, storage 1446, applications 1451, and/or graphics subsystem 1452. For example, chipset 1403 may include a storage adapter (not depicted) capable of providing intercommunication with storage 1446.

Processor element 1402 may be implemented using any processor or logic device, and may be the same as or similar to processor element 1302 in FIG. 13.

Memory unit 1404 may be implemented using any machine-readable or computer-readable media capable of storing data, and may be the same as or similar to memory unit 1304 in FIG. 13.

Transceiver 1444 may include one or more radios capable of transmitting and receiving signals using various suitable wireless communications techniques, and may be the same as or similar to transceiver 1344 in FIG. 13.

Display 1445 may include any television type monitor or display, and may be the same as or similar to display 1345 in FIG. 13.

Storage 1446 may be implemented as a non-volatile storage device, and may be the same as or similar to storage 1346 in FIG. 13.

Graphics subsystem 1452 may perform processing of images such as still or video for display. Graphics subsystem 1452 may be a graphics processing unit (GPU) or a visual processing unit (VPU), for example. An analog or digital interface may be used to communicatively couple graphics subsystem 1452 and display 1445. For example, the interface may be any of a High-Definition Multimedia Interface, DisplayPort, wireless HDMI, and/or wireless HD compliant techniques. Graphics subsystem 1452 could be integrated into processor element 1402 or chipset 1403. Graphics subsystem 1452 could be a stand-alone card communicatively coupled to chipset 1403.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1448 may be hosted by any national, international and/or independent service and thus accessible to platform 1401 via the Internet, for example. Content services device(s) 1448 may be coupled to platform 1401 and/or to display 1445. Platform 1401 and/or content services device(s) 1448 may be coupled to a network 1453 to communicate (e.g., send and/or receive) media information to and from network 1453. Content delivery device(s) 1449 also may be coupled to platform 1401 and/or to display 1445.

In embodiments, content services device(s) 1448 may include a cable television box, personal computer, network, telephone, Internet enabled devices or appliance capable of delivering digital information and/or content, and any other similar device capable of unidirectionally or bidirectionally communicating content between content providers and platform 1401 and/display 1445, via network 1453 or directly. It will be appreciated that the content may be communicated unidirectionally and/or bidirectionally to and from any one of the components in system 1400 and a content provider via network 1453. Examples of content may include any media information including, for example, video, music, medical and gaming information, and so forth.

Content services device(s) 1448 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1401 may receive control signals from navigation controller 1450 having one or more navigation features. The navigation features of navigation controller 1450 may be used to interact with a user interface 1454, for example. In embodiments, navigation controller 1450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1450 may be echoed on a display (e.g., display 1445) by movements of a pointer, cursor, focus ring, or other visual indicators displayed on the display. For example, under the control of software applications 1451, the navigation features located on navigation controller 1450 may be mapped to virtual navigation features displayed on user interface 1454. In embodiments, navigation controller 1450 may not be a separate component but integrated into platform 1401 and/or display 1445. Embodiments, however, are not limited to the elements or in the context shown or described herein.

In embodiments, drivers (not shown) may include technology to enable users to instantly turn on and off platform 1401 like a television with the touch of a button after initial boot-up, when enabled, for example. Program logic may allow platform 1401 to stream content to media adaptors or other content services device(s) 1448 or content delivery device(s) 1449 when the platform is turned "off." In addition, chip set 1403 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1400 may be integrated. For example, platform 1401 and content services device(s) 1448 may be integrated, or platform 1401 and content delivery device(s) 1449 may be integrated, or platform 1401, content services device(s) 1448, and content delivery device(s) 1449 may be integrated, for example. In various embodiments, platform 1401 and display 1445 may be an integrated unit. Display 1445 and content service device(s) 1448 may be integrated, or display 1445 and content delivery device(s) 1449 may be integrated, for example. These examples are not meant to limit the disclosed subject matter.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1401 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
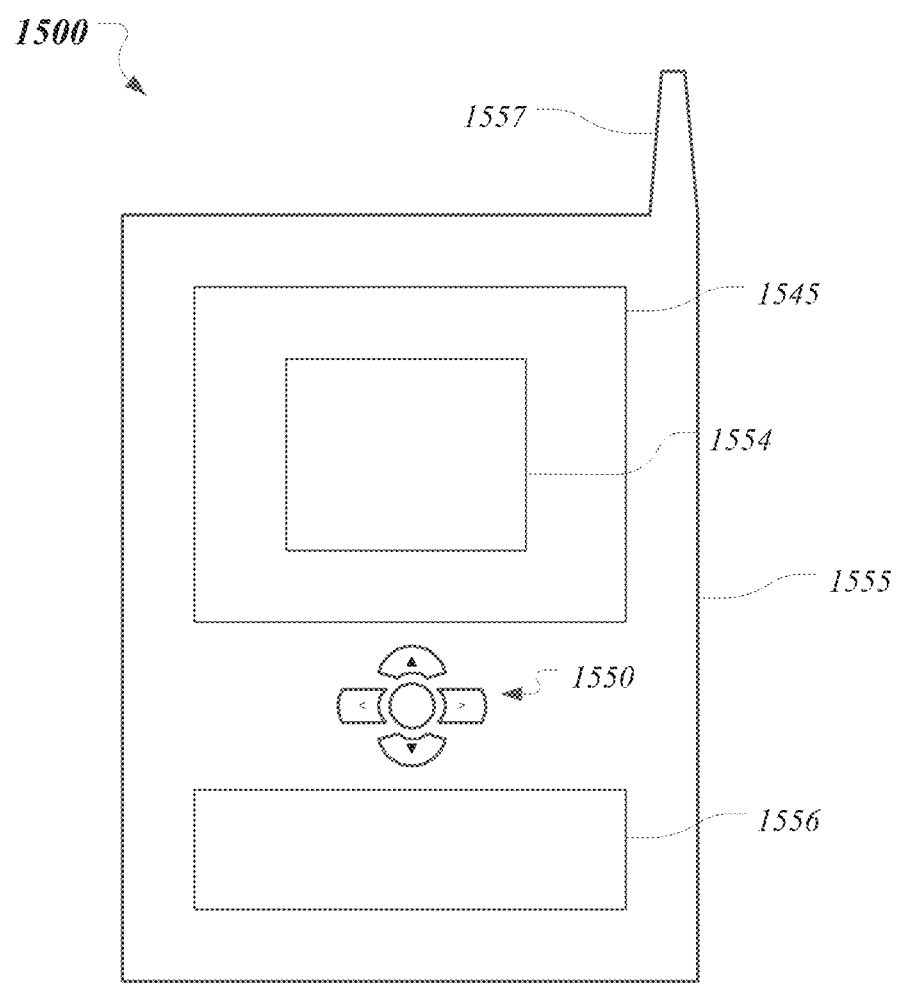
FIG. 15 illustrates one embodiment of a device.

As described above, system 1400 may be embodied in varying physical styles or form factors. FIG. 15 illustrates embodiments of a small form factor device 1500 in which system 1400 may be embodied. In embodiments, for example, device 1500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a display 1545, a navigation controller 1550, a user interface 1554, a housing 1555, an I/O device 1556, and an antenna 1557. Display 1545 may include any suitable display unit for displaying information appropriate for a mobile computing device, and may be the same as or similar to display 1445 in FIG. 14. Navigation controller 1550 may include one or more navigation features which may be used to interact with user interface 1554, and may be the same as or similar to navigation controller 1450 in FIG. 14. I/O device 1556 may include any suitable I/O device for entering information into a mobile computing device. Examples for I/O device 1556 may include an alphanumeric keyboard, a numeric keypad, a touch pad, input keys, buttons, switches, rocker switches, microphones, speakers, voice recognition device and software, and so forth. Information also may be entered into device 1500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a context information management apparatus, comprising: a processor element; a selection component for execution by the processor element to select a context information item; a random number generator to generate a random number; and an anonymization component for execution by the processor element to generate a random key based on the random number and send a message associating the context information item with the random key.

In Example 2, the context information item of Example 1 may optionally comprise a value and a type indicator for the value.

In Example 3, the anonymization component of any one of Examples 1 to 2 may optionally be for execution by the processor element to store mapping information indicating the association of the context information item with the random key.

In Example 4, the context information management apparatus of any one of Examples 1 to 3 may optionally comprise a sharing component for execution by the processor element to enable a content provider to view the context information item by providing the random key.

In Example 5, the context information management apparatus of Example 4 may optionally comprise: a pseudorandom number generator; and a seeding component for execution by the processor element to seed the pseudorandom number generator using the random number, and generate the random key using the seeded pseudorandom number generator.

In Example 6, the sharing component of Example 5 may optionally be for execution by the processor element to provide the random number to an external device in order to enable the external device to submit context information on behalf of the context information management apparatus.

In Example 7, the seeding component of any one of Examples 5 to 6 may optionally be for execution by the processor element to generate seeds corresponding to multiple levels of an ontology scheme, the random number comprising a root seed for the ontology scheme.

In Example 8, the anonymization component of any one of Examples 1 to 7 may optionally be for execution by the processor element to implement a trusted execution environment supporting a trusted link and send the message via the trusted link.

In Example 9, the anonymization component of Example 8 may optionally be for execution by the processor element to implement the trusted execution environment using an enhanced privacy identifier (EPID).

In Example 10, the anonymization component of Example 9 may optionally be for execution by the processor element to establish the trusted link using a signed key exchange, the EPID comprising a signing key for use in the signed key exchange.

In Example 11, the signed key exchange of Example 10 may optionally comprise a Diffie-Hellman key exchange.

In Example 12, the selection component of any one of Examples 1 to 11 may optionally be for execution by the processor element to select the context information item based on one or more privacy settings indicating types of context information to be provided to a context information database.

Example 13 is system, comprising: a context information management apparatus according to any one of Examples 1 to 12; a display; a radio frequency (RF) transceiver; and one or more RF antennas.

Example 14 is at least one machine-readable medium comprising a set of context information management instructions that, in response to being executed on a computing device, cause the computing device to: select a context information item; generate a random key; and send a message associating the context information item with the random key.

In Example 15, the context information item of Example 14 may optionally comprise a value and a type indicator for the value.

In Example 16, the at least one machine-readable medium of any one of Examples 14 to 15 may optionally comprise context information management instructions that, in response to being executed on the computing device, cause the computing device to store mapping information indicating the association of the context information item with the random key.

In Example 17, the at least one machine-readable medium of any one of Examples 14 to 16 may optionally comprise context information management instructions that, in response to being executed on the computing device, cause the computing device to enable a content provider to view the context information item by providing the random key.

In Example 18 the at least one machine-readable medium of any one of Examples 14 to 17 may optionally comprise context information management instructions that, in response to being executed on the computing device, cause the computing device to: generate a random number; and generate the random key based on the random number.

In Example 19, the at least one machine-readable medium of Example 18 may optionally comprise context information management instructions that, in response to being executed on the computing device, cause the computing device to: seed a pseudorandom number generator using the random number; and generate the random key using the seeded pseudorandom number generator.

In Example 20, the at least one machine-readable medium of Example 19 may optionally comprise context information management instructions that, in response to being executed on the computing device, cause the computing device to provide the random number to an external device in order to enable the external device to submit context information on behalf of the computing device.

In Example 21, the at least one machine-readable medium of any one of Examples 19 to 20 may optionally comprise context information management instructions that, in response to being executed on the computing device, cause the computing device to generate seeds corresponding to multiple levels of an ontology scheme, the random number comprising a root seed for the ontology scheme.

In Example 22, the at least one machine-readable medium of any one of Examples 14 to 21 may optionally comprise context information management instructions that, in response to being executed on the computing device, cause the computing device to implement a trusted execution environment supporting a trusted link and send the message via the trusted link.

In Example 23, the at least one machine-readable medium of Example 22 may optionally comprise context information management instructions that, in response to being executed on the computing device, cause the computing device to implement the trusted execution environment using an enhanced privacy identifier (EPID).

In Example 24, the at least one machine-readable medium of Example 23 may optionally comprise context information management instructions that, in response to being executed on the computing device, cause the computing device to establish the trusted link using a signed key exchange, the EPID comprising a signing key for use in the signed key exchange.

In Example 25, the signed key exchange of Example 24 may optionally comprise a Diffie-Hellman key exchange.

In Example 26, the at least one machine-readable medium of any one of Examples 14 to 25 may optionally comprise context information management instructions that, in response to being executed on the computing device, cause the computing device to select the context information item based on one or more privacy settings indicating types of context information to be provided to a context information database.

Example 27 is a context information management method, comprising: selecting a context information item; generating a random key; and sending a message associating the context information item with the random key.

In Example 28, the context information item of Example 27 may optionally comprise a value and a type indicator for the value.

In Example 29, the context information management method of any one of Examples 27 to 28 may optionally comprise storing mapping information indicating the association of the context information item with the random key.

In Example 30, the context information management method of any one of Examples 27 to 29 may optionally comprise enabling a content provider to view the context information item by providing the random key.

In Example 31, the context information management method of any one of Examples 27 to 30 may optionally comprise: generating a random number; and generating the random key based on the random number.

In Example 32, the context information management method of Example 31 may optionally comprise: seeding a pseudorandom number generator using the random number; and generating the random key using the seeded pseudorandom number generator.

In Example 33, the context information management method of Example 32 may optionally comprise providing the random number to an external device in order to enable the external device to submit context information on behalf of the computing device.

In Example 34, the context information management method of any one of Examples 32 to 33 may optionally comprise generating seeds corresponding to multiple levels of an ontology scheme, the random number comprising a root seed for the ontology scheme.

In Example 35, the context information management method of any one of Examples 27 to 34 may optionally comprise: implementing a trusted execution environment supporting a trusted link; and sending the message via the trusted link.

In Example 36, the context information management method of Example 35 may optionally comprise implementing the trusted execution environment using an enhanced privacy identifier (EPID).

In Example 37, the context information management method of Example 36 may optionally comprise establishing the trusted link using a signed key exchange, the EPID comprising a signing key for use in the signed key exchange.

In Example 38, the signed key exchange of Example 37 may optionally comprise a Diffie-Hellman key exchange.

In Example 39, the context information management method of any one of Examples 27 to 38 may optionally comprise selecting the context information item based on one or more privacy settings indicating types of context information to be provided to a context information database.

Example 40 is an apparatus, comprising means for performing a context information management method according to any one of Examples 27 to 39.

Example 41 is a system, comprising: an apparatus according to Example 40; a display; a radio frequency (RF) transceiver; and one or more RF antennas.

Example 42 is a communications device arranged to perform a context information management method according to any one of Examples 27 to 39.

Example 43 is a context information management apparatus, comprising: means for selecting a context information item; means for generating a random key; and means for sending a message associating the context information item with the random key.

In Example 44, the context information item of Example 43 may optionally comprise a value and a type indicator for the value.

In Example 45, the context information management apparatus of any one of Examples 43 to 44 may optionally comprise means for storing mapping information indicating the association of the context information item with the random key.

In Example 46, the context information management apparatus of any one of Examples 43 to 45 may optionally comprise means for enabling a content provider to view the context information item by providing the random key.

In Example 47, the context information management apparatus of any one of Examples 43 to 46 may optionally comprise: means for generating a random number; and means for generating the random key based on the random number.

In Example 48, the context information management apparatus of Example 47 may optionally comprise: means for seeding a pseudorandom number generator using the random number; and means for generating the random key using the seeded pseudorandom number generator.

In Example 49, the context information management apparatus of Example 48 may optionally comprise means for providing the random number to an external device in order to enable the external device to submit context information on behalf of the computing device.

In Example 50, the context information management apparatus of any one of Examples 48 to 49 may optionally comprise means for generating seeds corresponding to multiple levels of an ontology scheme, the random number comprising a root seed for the ontology scheme.

In Example 51, the context information management apparatus of any one of Examples 43 to 50 may optionally comprise: means for implementing a trusted execution environment supporting a trusted link; and means for sending the message via the trusted link.

In Example 52, the context information management apparatus of Example 51 may optionally comprise means for implementing the trusted execution environment using an enhanced privacy identifier (EPID).

In Example 53, the context information management apparatus of Example 52 may optionally comprise means for establishing the trusted link using a signed key exchange, the EPID comprising a signing key for use in the signed key exchange.

In Example 54, the signed key exchange of Example 53 may optionally comprise a Diffie-Hellman key exchange.

In Example 55, the context information management apparatus of any one of Examples 43 to 54 may optionally comprise means for selecting the context information item based on one or more privacy settings indicating types of context information to be provided to a context information database.

Example 56 is a context information management apparatus, comprising: a processor element; an indexing component for execution by the processor element to receive a message comprising a context information item and a random key and determine an index value for the context information item based on the random key; and an insertion component for execution by the processor element to insert the context information item into a context information database based on the index value.

In Example 57, the context information database of Example 56 may optionally comprise a table using a binary tree structure, the insertion component for execution by the processor element to insert the context information item into the context information database by traversing the binary tree structure based on the index value.

In Example 58, the context information item of any one of Examples 56 to 57 may optionally comprise a value and a type indicator for the value.

In Example 59, the context information management apparatus of any one of Examples 56 to 58 may optionally comprise a search component for execution by the processor element to receive a query comprising the random key and return the context information item in response to the query.

In Example 60, the indexing component of any one of Examples 56 to 59 may optionally be for execution by the processor element to receive the message via a trusted link associated with a trusted execution environment.

In Example 61, the context information management apparatus of Example 60 may optionally comprise an authentication component for execution by the processor element to attest the trusted execution environment.

In Example 62, the trusted execution environment of Example 61 may optionally be implemented using an enhanced privacy identifier (EPID).

In Example 63, the authentication component of Example 62 may optionally be for execution by the processor element to attest the trusted execution environment using the EPID.

In Example 64, the EPID of Example 63 may optionally comprise a signing key used in a signed key exchange that establishes the trusted link.

In Example 65, the signed key exchange of Example 64 may optionally comprise a Diffie-Hellman key exchange.

Example 66 is a system, comprising: a context information management apparatus according to any one of Examples 56 to 65; a radio frequency (RF) transceiver; and one or more RF antennas.

Example 67 is at least one machine-readable medium comprising a set of context information management instructions that, in response to being executed on a computing device, cause the computing device to: receive a message comprising a context information item and a random key; determine an index value for the context information item based on the random key; and insert the context information item into a context information database based on the index value.

In Example 68, the at least one machine-readable medium of Example 67 may optionally comprise context information management instructions that, in response to being executed on the computing device, cause the computing device to insert the context information item into the context information database by traversing a binary tree structure of the context information database based on the index value.

In Example 69, the context information item of any one of Examples 67 to 68 may optionally comprise a value and a type indicator for the value.

In Example 70, the at least one machine-readable medium of any one of Examples 67 to 69 may optionally comprise context information management instructions that, in response to being executed on the computing device, cause the computing device to receive a query comprising the random key and return the context information item in response to the query.

In Example 71, the at least one machine-readable medium of any one of Examples 67 to 70 may optionally comprise context information management instructions that, in response to being executed on the computing device, cause the computing device to receive the message via a trusted link associated with a trusted execution environment.

In Example 72, the at least one machine-readable medium of Example 71 may optionally comprise context information management instructions that, in response to being executed on the computing device, cause the computing device to attest the trusted execution environment.

In Example 73, the trusted execution environment of Example 72 may optionally be implemented using an enhanced privacy identifier (EPID).

In Example 74, the at least one machine-readable medium of Example 73 may optionally comprise context information management instructions that, in response to being executed on the computing device, cause the computing device to attest the trusted execution environment using the EPID.

In Example 75, the EPID of Example 74 may optionally comprise a signing key used in a signed key exchange that establishes the trusted link.

In Example 76, the signed key exchange of Example 75 may optionally comprise a Diffie-Hellman key exchange.

Example 77 is a context information management method, comprising: receiving a message comprising a context information item and a random key; determining an index value for the context information item based on the random key; and inserting the context information item into a context information database based on the index value.

In Example 78, the context information management method of Example 77 may optionally comprise inserting the context information item into the context information database by traversing a binary tree structure of the context information database based on the index value.

In Example 79, the context information item of any one of Examples 77 to 78 may optionally comprise a value and a type indicator for the value.

In Example 80, the context information management method of any one of Examples 77 to 79 may optionally comprise: receiving a query comprising the random key; and returning the context information item in response to the query.

In Example 81, the context information management method of any one of Examples 77 to 80 may optionally comprise receiving the message via a trusted link associated with a trusted execution environment.

In Example 82, the context information management method of Example 81 may optionally comprise attesting the trusted execution environment.

In Example 83, the trusted execution environment of Example 82 may optionally be implemented using an enhanced privacy identifier (EPID).

In Example 84, the context information management method of Example 83 may optionally comprise attesting the trusted execution environment using the EPID.

In Example 85, the EPID of Example 84 may optionally comprise a signing key used in a signed key exchange that establishes the trusted link.

In Example 86, the signed key exchange of Example 85 may optionally comprise a Diffie-Hellman key exchange.

Example 87 is an apparatus, comprising means for performing a context information management method according to any one of Examples 77 to 86.

Example 88 is a system, comprising: an apparatus according to Example 87; a radio frequency (RF) transceiver; and one or more RF antennas.

Example 89 is a context information management apparatus, comprising: means for receiving a message comprising a context information item and a random key; means for determining an index value for the context information item based on the random key; and means for inserting the context information item into a context information database based on the index value.

In Example 90, the context information management apparatus of Example 89 may optionally comprise means for inserting the context information item into the context information database by traversing a binary tree structure of the context information database based on the index value.

In Example 91, the context information item of any one of Examples 89 to 90 may optionally comprise a value and a type indicator for the value.

In Example 92, the context information management apparatus of any one of Examples 89 to 91 may optionally comprise: means for receiving a query comprising the random key; and means for returning the context information item in response to the query.

In Example 93, the context information management apparatus of any one of Examples 89 to 92 may optionally comprise means for receiving the message via a trusted link associated with a trusted execution environment.

In Example 94, the context information management apparatus of Example 93 may optionally comprise means for attesting the trusted execution environment.

In Example 95, the trusted execution environment of Example 94 may optionally be implemented using an enhanced privacy identifier (EPID).

In Example 96, the context information management apparatus of Example 95 may optionally comprise means for attesting the trusted execution environment using the EPID.

In Example 97, the EPID of Example 96 may optionally comprise a signing key used in a signed key exchange that establishes the trusted link.

In Example 98, the signed key exchange of Example 97 may optionally comprise a Diffie-Hellman key exchange.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor element implemented in hardware;
a selection component that when executed by the processor element to select a context information item comprising a value and a type indicator, the selection component to select the context information item based on at least one privacy setting configured to indicate types of information to be provided to a context information database and the at least one privacy setting to indicate when to provide the types of information to the context information database, the type indicator comprising information identifying at least one of a characteristic or a property of the value;
a random number generator to generate a random number, the random number generator implemented in hardware or executed by the processor element;
an anonymization component that when executed by the processor element to:
generate a random key based on the random number,
generate a context information unit comprising the value, the type indicator, and the random key, and
send a message comprising the context information unit based on the at least one privacy setting; and
a sharing component that when executed by the processor element to enable a content provider to view the context information item by providing the random key.

2. The apparatus of claim 1, comprising:
a pseudorandom number generator executed by the processor element; and
a seeding component that when executed by the processor element to seed the pseudorandom number generator using the random number, and generate the random key using the seeded pseudorandom number generator.

3. The apparatus of claim 1, the anonymization component, when executed by the processor element, to store mapping information indicating an association of the context information item with the random key.

4. The apparatus of claim 1, the anonymization component, when executed by the processor element, to implement a trusted execution environment supporting a trusted link and send the message via the trusted link.

5. The apparatus of claim 1, the anonymization component, when executed by the processor element, to implement a trusted execution environment (TEE) to establish a secure and anonymous trusted link with a computing device receiving the message.

6. The apparatus of claim 5, the TEE established using an enhanced privacy identifier (EPID).

7. At least one non-transitory machine-readable medium comprising a set of instructions that, in response to being executed on a computing device, cause the computing device to:
select a context information item comprising a value and a type indicator, a selection component to select the context information item based on at least one privacy setting configured to indicate types of information to be provided to a context information database and the at least one privacy setting to indicate when to provide the types of information to the context information database, the type indicator comprising information identifying at least one of a characteristic or a property of the value;
generate a random key;
generate a context information unit comprising the value, the type indicator, and the random key;
send a message comprising the context information unit based on the at least one privacy setting; and
enable a content provider to view the context information item by providing the random key.

8. The at least one non-transitory machine-readable medium of claim 7, comprising instructions that, in response to being executed on the computing device, cause the computing device to:
generate a random number; and
generate the random key based on the random number.

9. The at least one non-transitory machine-readable medium of claim 8, comprising instructions that, in response to being executed on the computing device, cause the computing device to:
seed a pseudorandom number generator executed by a processor of the computing system using the random number; and
generate the random key using the seeded pseudorandom number generator.

10. The at least one non-transitory machine-readable medium of claim 7, comprising instructions that, in response to being executed on the computing device, cause the computing device to store mapping information indicating an association of the context information item with the random key.

11. The at least one non-transitory machine-readable medium of claim 7, comprising instructions that, in response to being executed on the computing device, cause the computing device to implement a trusted execution environment supporting a trusted link and send the message via the trusted link.

* * * * *